United States Patent
Sheldon et al.

(10) Patent No.: US 11,316,791 B2
(45) Date of Patent: Apr. 26, 2022

(54) METHODS AND APPARATUS FOR SCALABLE NETWORK SECURITY FUNCTIONS

(71) Applicant: CORSA TECHNOLOGY INC., Ottawa (CA)

(72) Inventors: Stacey Sheldon, Ottawa (CA); Peter Bengough, Kanata (CA); Ian Mes, Kanata (CA); Ian Dublin, Nepean (CA)

(73) Assignee: CORSA TECHNOLOGY INC.

( * ) Notice: Subject to any disclaimer, the term of this patent is extended or adjusted under 35 U.S.C. 154(b) by 183 days.

(21) Appl. No.: 16/751,896

(22) Filed: Jan. 24, 2020

(65) Prior Publication Data

US 2021/0234800 A1    Jul. 29, 2021

(51) Int. Cl.
*H04L 47/125*    (2022.01)
*H04L 47/32*    (2022.01)
*G06F 9/50*    (2006.01)
*G06F 9/455*    (2018.01)
*H04L 29/06*    (2006.01)

(52) U.S. Cl.
CPC ............ *H04L 47/125* (2013.01); *G06F 9/455* (2013.01); *G06F 9/5077* (2013.01); *H04L 47/32* (2013.01); *H04L 63/0218* (2013.01); *H04L 63/0272* (2013.01)

(58) Field of Classification Search
None
See application file for complete search history.

(56) References Cited

U.S. PATENT DOCUMENTS

| | | | | |
|---|---|---|---|---|
| 10,153,978 | B1* | 12/2018 | di Proietto | H04L 45/021 |
| 11,075,987 | B1* | 7/2021 | Solapurkar | H04L 67/1023 |
| 2016/0182380 | A1* | 6/2016 | Mehra | H04L 45/7453 |
| | | | | 709/226 |
| 2017/0005935 | A1* | 1/2017 | Tao | H04L 67/1002 |
| 2018/0302337 | A1* | 10/2018 | Zhao | G06F 9/50 |

OTHER PUBLICATIONS

Alberto Rivai, Palo Alto Networks Firewall in Vwire mode, pp. 1-10, Oct. 25 (Year: 2018).*
Z. Qazi, C. Tu, L. Chiang, R. Mial, V. Sekar, M. Yu, Simple-fying Middlebox Policy Enforcement using SDN, pp. 1-12, (Year: 2013).*

(Continued)

*Primary Examiner* — Christopher M Crutchfield
(74) *Attorney, Agent, or Firm* — Barnes & Thornburg, LLP

(57) ABSTRACT

The present disclosure relates to scalable network security functions and handling of packet flows between network security zones in a communications network. Packets that are part of a bidirectional packet flow between the network security zones are received, and a determination is made as to an instance of a security application to which to assign the bidirectional packet flow for security processing. The determination is made based on relative loading of a plurality of identical instances of the security application running on a host machine. All of the received packets that are part of the bidirectional packet flow are directed for processing on the host machine by the one of the security application instances.

24 Claims, 14 Drawing Sheets

(56) References Cited

OTHER PUBLICATIONS

Shriram Rajagopalan, Dan Williams, Hani Jamjoom, and Andrew Warfield, Split/Merge: System Support for Elastic Execution in Virtual Middleboxes, pp. 227-240, (Year: 2013).*

Aaron Gember-Jacobson, Raajay Viswanathan, Chaithan Prakash, Robert Grandl, Junaid Khalid, Sourav Das, and Aditya Akella, OpenNF: Enabling Innovation in Network Function Control, pp. 163-174, (Year: 2014).*

Milad Ghaznavi, Nashid Shahriar, Shahin Kamali, Reaz Ahmed, and Raouf Boutaba, Distributed Service Function Chaining, pp. 1-11, (Year: 2017).*

* cited by examiner

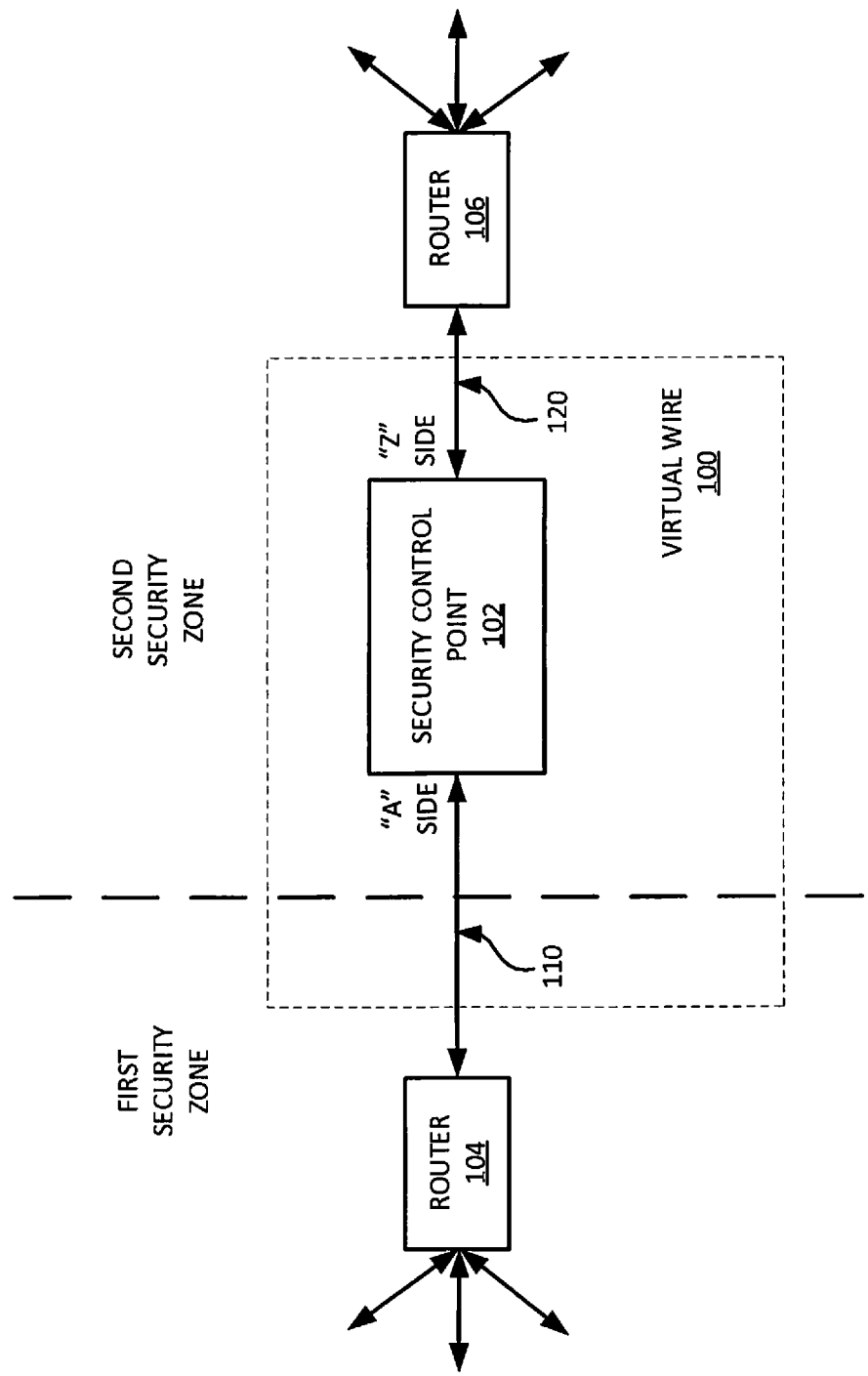

METHODS AND APPARATUS FOR SCALABLE NETWORK SECURITY FUNCTIONS

TECHNICAL FIELD

Embodiments herein generally relate to the field of communications networks and more specifically to the handling of data packets to enhance the security of communications networks and scale network security infrastructure with traffic volume.

BACKGROUND

Network security systems provide security functions to communications networks. These functions could include, for example, firewalling, in which a barrier to malicious traffic between a trusted network such as a private corporate network and another untrusted network, such as the Internet, for example, is provided. Network security functions could also or instead include: monitoring and logging of network traffic; intrusion detection; intrusion prevention; decryption of encrypted traffic for enhanced visibility. Malicious attacks on communications networks are growing in sophistication and size. Scalable network security functions could beneficially improve network security.

SUMMARY

According to one aspect of the present disclosure, a system for handling packet flows between a pair of network security zones in a communications network includes an interface to receive packets that are part of a bidirectional packet flow between the network security zones; and a load balancer, coupled to the interface, to: determine, based on relative loading of a plurality of identical instances of a security application running on a host machine, one instance of the plurality of identical instances of the security application to which to assign the bidirectional packet flow for security processing; and to direct all of the received packets that are part of the bidirectional packet flow for processing on the host machine by the one of the security application instances.

In some embodiments, the system is interposed between a first network node and a second network node, and the system is transparent to the first network node and the second network node at and above the layer 2 data link layer of the Open Systems Interconnect model.

The load balancer may be configured to qualify one or more of the instances as being available for assignment of the bidirectional packet flow, and to determine the one instance to which to assign the bidirectional packet flow from among the one or more of the instances qualified as being available for assignment of the bidirectional packet flow.

For example, the load balancer may be configured to qualify the one or more of the instances based on individual loading of each instance of the plurality of identical instances relative to an average loading of the plurality of identical instances.

In an embodiment, the load balancer is configured to qualify each instance of the plurality of identical instances which has an individual loading that is below the average loading of the plurality of identical instances.

The load balancer may be configured to qualify each instance of the plurality of identical instances which has an individual loading that is below the average loading of the plurality of identical instances and a configurable margin term.

In another embodiment, the load balancer is configured to qualify the one or more of the instances based on individual loading of each instance of the plurality of identical instances relative to a loading limit.

According to some embodiments, the load balancer is configured to determine one or more loading metrics associated with individual loadings of the plurality of identical instances.

The one or more loading metrics may be or include through packet latency, for example.

In an embodiment, the load balancer is configured to determine an average through packet latency of the plurality of identical instances, and to randomly discard and/or allow bidirectional packet flows based on the average through packet latency relative to a through packet latency threshold value.

The load balancer may be configured to determine the one instance to which to assign the bidirectional packet flow further based on an assignment round in which one or more instances of the plurality of identical instances of the security application are available for assignment of one or more bidirectional packet flows. The assignment round may be time-limited to a time period, in which case the load balancer may be configured to qualify one or more of the instances as being available for assignment of the bidirectional packet flow in a next assignment round after the time period associated with a current assignment round expires.

In some embodiments, the load balancer is one of a plurality of load balancers, and the system also includes a primary load balancer, coupled to the interface and to the plurality of load balancers, to receive from the interface packets associated with a plurality of bidirectional packet flows, to determine for each bidirectional packet flow of the plurality of bidirectional packet flows a respective load balancer of the plurality of load balancers to which received packets associated with the bidirectional packet flow are to be directed, and to direct all of the received packets that are associated with each bidirectional packet flow to the respective load balancer to which received packets associated with the bidirectional packet flow are to be directed.

The primary load balancer may be configured to determine the respective load balancer to which received packets associated with each bidirectional packet flow are to be directed based on a hash value calculated from one or more fields in a header of each received packet. For example, the hash value may be calculated based on a directionally symmetric hash function that produces identical hash values for all packets in a particular bidirectional packet flow.

The load balancers of the plurality of load balancers may be configured to exchange information associated with their individual loadings of the plurality of identical instances of the security application. For example, the information associated with the individual loadings may be or include one or more loading metrics, determined by each load balancer of the plurality of load balancers, associated with the individual loading of an instance of the plurality of identical instances by the load balancer. The information associated with loading may be or include information indicative of a determination, by each load balancer of the plurality of load balancers, of the individual loading of an instance of the plurality of identical instances by the load balancer.

In another embodiment in which the load balancer is one of a plurality of load balancers, each load balancer of the plurality of load balancers may be associated with a respective one of a plurality of security applications including the security application, and the system may also include a classifier, coupled to the interface and to the plurality of load balancers, to receive from the interface packets associated with a plurality of bidirectional packet flows, to determine for each bidirectional packet flow of the plurality of bidirectional packet flows a respective one of the security applications of the plurality of security applications by which the bidirectional packet flow is to be processed, and to send all of the received packets that are associated with each bidirectional packet flow to the load balancer associated with the respective one of the plurality of security applications by which the bidirectional packet flow is to be processed.

One of the security zones may include multiple tenants, with each load balancer of the plurality of load balancers being associated with a respective tenant. The classifier may be configured to determine the one of the security applications of the plurality of security applications by which each bidirectional packet flow is to be processed based on the one of the tenants to which each bidirectional packet flow belongs.

A system may also include a packet switch, coupled to the interface and to the load balancer, and the load balancer may be configured to control the packet switch to direct the received packets for processing on the host machine by the one of the security application instances to which the bidirectional packet flow is assigned.

According to another aspect of the present disclosure, a method for handling packet flows between a pair of network security zones in a communications network may involve: receiving packets that are part of a bidirectional packet flow between the network security zones; determining, based on relative loading of a plurality of identical instances of a security application running on a host machine, one instance of the plurality of identical instances of the security application to which to assign the bidirectional packet flow for security processing; directing all of the received packets that are part of the bidirectional packet flow for processing on the host machine by the one of the security application instances.

The bidirectional packet flow is between a first network node and a second network node in some embodiments, and the method may be implemented in a system that is transparent to the first network node and the second network node at and above the layer 2 data link layer of the Open Systems Interconnect model.

A method may include qualifying one or more of the instances as being available for assignment of the bidirectional packet flow, in which case the determining may involve determining the one instance to which to assign the bidirectional packet flow from among the one or more of the instances qualified as being available for assignment of the bidirectional packet flow.

The qualifying may involve, for example, qualifying the one or more of the instances based on individual loading of each instance of the plurality of identical instances relative to an average loading of the plurality of identical instances, such as qualifying each instance of the plurality of identical instances which has an individual loading that is below the average loading of the plurality of identical instances, or qualifying each instance of the plurality of identical instances which has an individual loading that is below the average loading of the plurality of identical instances and a configurable margin term.

The qualifying may also or instead involve qualifying the one or more of the instances based on individual loading of each instance of the plurality of identical instances relative to a loading limit.

In some embodiments, a method involves determining one or more loading metrics associated with individual loadings of the plurality of identical instances. The one or more loading metrics may be or include through packet latency, for example.

A method may involve determining an average through packet latency of the plurality of identical instances; and randomly discarding or allowing bidirectional packet flows based on the average packet latency relative to a through packet latency threshold value.

Determining the one instance may involve determining the one instance to which to assign the bidirectional packet flow further based on an assignment round in which one or more instances of the plurality of identical instances of the security application are available for assignment of one or more bidirectional packet flows.

The assignment round may be time-limited to a time period, and the method may involve qualifying one or more of the instances as being available for assignment of the bidirectional packet flow in a next assignment round after the time period associated with a current assignment round expires.

Determining the one instance and directing the received packets may be implemented in each of a plurality of load balancers, and the method may also involve receiving packets associated with a plurality of bidirectional packet flows; determining for each bidirectional packet flow of the plurality of bidirectional packet flows a respective load balancer of the plurality of load balancers to which received packets associated with the bidirectional packet flow are to be directed; and directing all of the received packets that are associated with each bidirectional packet flow to the respective load balancer to which the received packets associated with the bidirectional packet flow are to be directed.

The operation of determining the respective load balancer to which received packets associated with each bidirectional packet flow are to be directed may involve determining the respective load balancer based on a hash value calculated from one or more fields in a header of each received packet. The hash value may be calculated based on a directionally symmetric hash function that produces identical hash values for all packets in a particular bidirectional packet flow.

A method may include exchanging, between the load balancers of the plurality of load balancers, information associated with individual loadings of the plurality of identical instances of the security application by the load balancers. The information associated with the individual loadings may be or include one or more loading metrics, determined by each load balancer of the plurality of load balancers, associated with the individual loading of an instance of the plurality of identical instances by the load balancer. The information associated with the individual loadings may also or instead include information indicative of a determination, by each load balancer of the plurality of load balancers, of the individual loading of an instance of the plurality of identical instances by the load balancer.

In some embodiments, determining the one instance and directing the received packets are implemented in each of a plurality of load balancers, with each load balancer of the plurality of load balancers being associated with a respective one of a plurality of security applications including the security application. The method may then include receiving packets associated with a plurality of bidirectional packet flows; determining for each bidirectional packet flow of the plurality of bidirectional packet flows a respective one of the security applications of the plurality of security applications by which the bidirectional packet flow is to be processed; and sending all of the received packets that are associated with each bidirectional packet flow to the load balancer associated with the respective one of the plurality of security applications by which the bidirectional packet flow is to be processed.

One of the security zones may include multiple tenants, with each load balancer of the plurality of load balancers being associated with a respective tenant. Determining a respective one of the security applications may then involve determining the one of the security applications of the plurality of security applications by which each bidirectional packet flow is to be processed based on the one of the tenants to which each bidirectional packet flow belongs.

Directing the received packets may involve controlling a packet switch to direct the received packets for processing on the host machine by the one of the security application instances to which the bidirectional packet flow is assigned.

Other aspects and features of embodiments of the present disclosure will become apparent to those ordinarily skilled in the art upon review of the following description.

BRIEF DESCRIPTION OF THE DRAWINGS

Embodiments herein will be better understood from the following detailed description with reference to the drawings, in which:

FIG. 1C is a block diagram depicting an example virtual wire implementation in a communications network.

DETAILED DESCRIPTION

Introduction

Figure 1A:
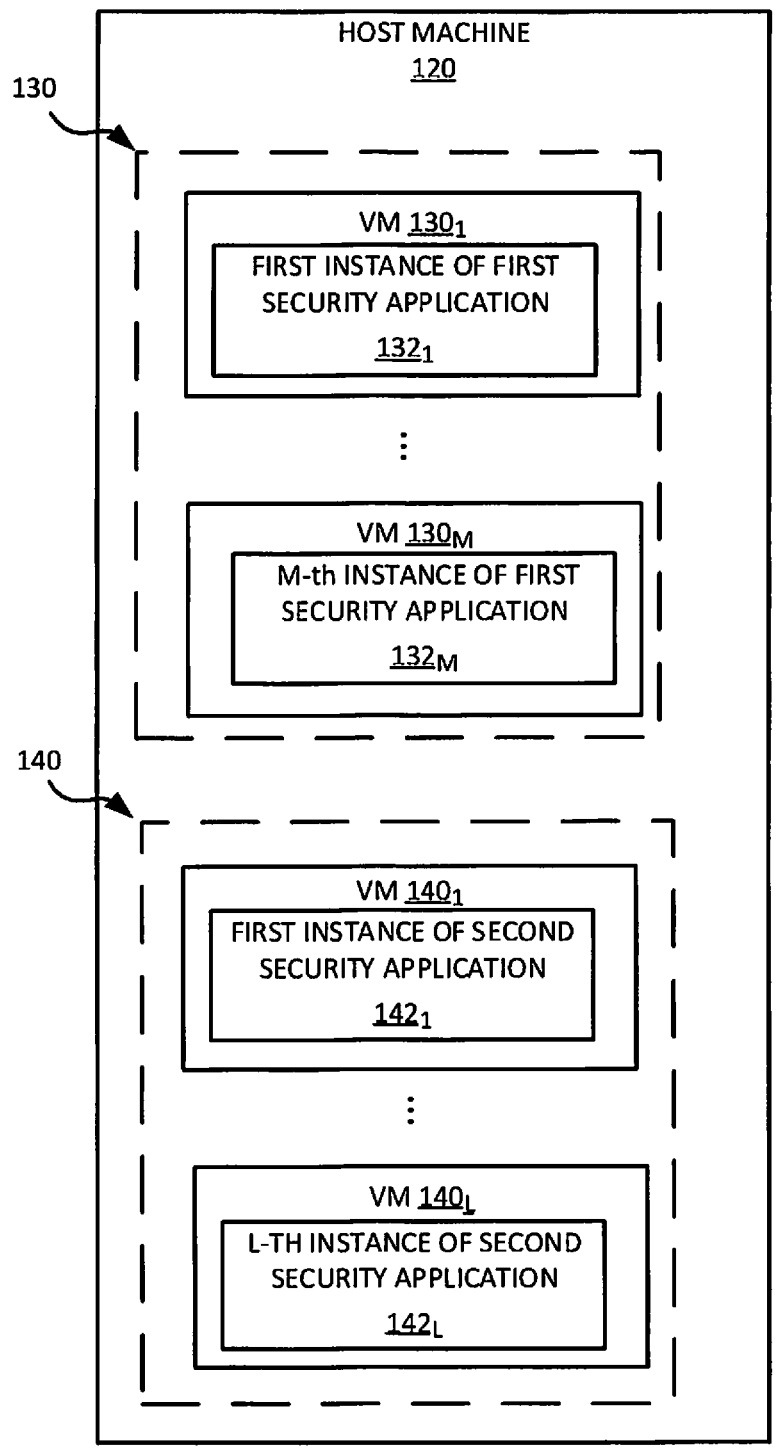
FIG. 1A is a block diagram of an example host machine hosting multiple Virtual Machines (VMs).

Communication traffic can take any of various forms and include any of various types of information. Data flows and data packets as referenced herein are examples of communication traffic to which the embodiments disclosed herein could be applied. The present disclosure is not necessarily limited to transfer of data, or to data or information that is specifically formatted into packets. Features that are disclosed herein with reference to data flows or data traffic could be applied to communication traffic other than data flows, to communication traffic that is formatted into blocks other than packets, and/or to communication traffic that includes content or payloads other than strictly data.

Data packets are organized according to protocols such as, for example, the Transmission Control Protocol (TCP) or the File Transfer Protocol (FTP). A data packet is typically organized into a header and a payload. The header contains information about the data packet such as its source and destination addresses. The payload is the actual data to be transferred.

A unidirectional packet "flow" is a unidirectional movement of data packets with a set of common characteristics. A set of common characteristics could be, for example, the packets' Internet Protocol (IP) source and destination addresses, IP protocol version, source and destination port addresses or numbers and IP class of service. A subset of one or more of these characteristics, and/or other packet characteristics, could be used to define a unidirectional packet flow. The set of common characteristics which define a unidirectional packet flow is also called the flow key.

Data communications could be two-way and comprise a first unidirectional packet flow sent from a first host to a second host and a corresponding second unidirectional return packet flow sent from the second host to the first host in response to the first unidirectional packet flow. For example, a first host could send a request to a second host for the contents of a web page. The second host could then send the web page to the first host. Two-way communications could use any two-way communications protocol such as TCP, for example. The combination of a unidirectional packet flow and its corresponding unidirectional return packet flow is called a bidirectional packet flow. A unidirectional packet flow may also be referred to herein as a unidirectional flow, and similarly a bidirectional packet flow may also be referred to herein as a bidirectional flow.

Scale Up/Scale Out

Scaling network security to meet increased communication traffic volumes could be a challenge. One approach is to "scale up". In the scale up approach, increasingly larger capacity security appliances are installed to handle increases in the volume of communication traffic.

Another approach is to "scale out". In this approach, the security task is spread across multiple security appliances running in parallel and additional security appliances are added incrementally to keep up with increases in traffic volume.

Virtualization

One way to implement scale out is using virtualization. In this approach, instead of using purpose-built security hardware, "virtual" security appliances are implemented using one or more components such as, for example, a multi-processor x86 server and/or other computing hardware to execute software as security applications. A security application, when executed, could cause or otherwise configure computing hardware to perform all the functions of a physical security appliance. Examples of security applications include firewalls, Intrusion Detection Systems (IDSs), Intrusion Prevention Systems and Network Security Monitors. Virtualization could be more economical than using purpose-built security hardware due to the relatively low cost and wide availability of computing hardware and its continually improving performance.

Virtualization could also allow security capacity to be adjusted faster than with purpose-built security hardware. For example, additional instances of a security application could be quickly created and added to a server to meet higher levels of traffic without deploying any additional purpose built security hardware. Conversely, at low traffic levels, security application instances could be removed to save on software licensing costs. The different instances of the same security application could be configured identically with identical security policies and identical security behaviors. Such identically configured instances of the same security application may be referred to as homogeneous instances, and/or as providing homogeneity among multiple security application instances.

A security application could run on a Virtual Machine (VM). A VM is a software emulation of a computer system. A VM runs on a physical computer or computing hardware, such as for example, a multi-processor x86 server. This physical computer is frequently referred to as a "host" machine. Multiple VMs can run on the same host machine. A VM could have configurable amounts of resources, such as computing, memory and/or communication bandwidth resources.

VMs can be created or removed from the host machine. A VM can run its own operating system. VMs on the same host machine can run different operating systems or versions of operating systems. For example, one VM might run a version of the Windows® operating system while a second VM on the same host machine might run a version of the Linux® operating system.

In one embodiment, a VM runs one and only one instance of a security application.

VMs could be organized into VM "clusters" with all VMs in a cluster running instances of the same security application and each instance configured with identical security policies and security behaviors. In this sense, a VM cluster may also be considered homogeneous.

FIG. 1A is a block diagram of an example host machine hosting multiple VMs. Host machine 120 hosts a first VM cluster 130. VM cluster 130 comprises "M" individual VMs $130_1 \ldots 130_M$. VMs $130_1 \ldots 130_M$ each run respective instances $132_1 \ldots 132_M$ of a first security application. Host machine 120 also hosts second VM cluster 140. VM cluster 140 comprises "L" individual VMs $140_1 \ldots 140_L$. VMs $140_1 \ldots 140_L$ each run respective instances $140_1 \ldots 140_L$ of a second security application.

FIG. 1A is an example only and host machine 120 could instead host a single VM cluster or additional VM clusters running additional instances of additional security applications. In general, it is expected that all instances of any particular security application will be running in one VM cluster. However, it should be appreciated that in general there may be one or more VM clusters to run one or more instances of a security application.

Figure 1B:
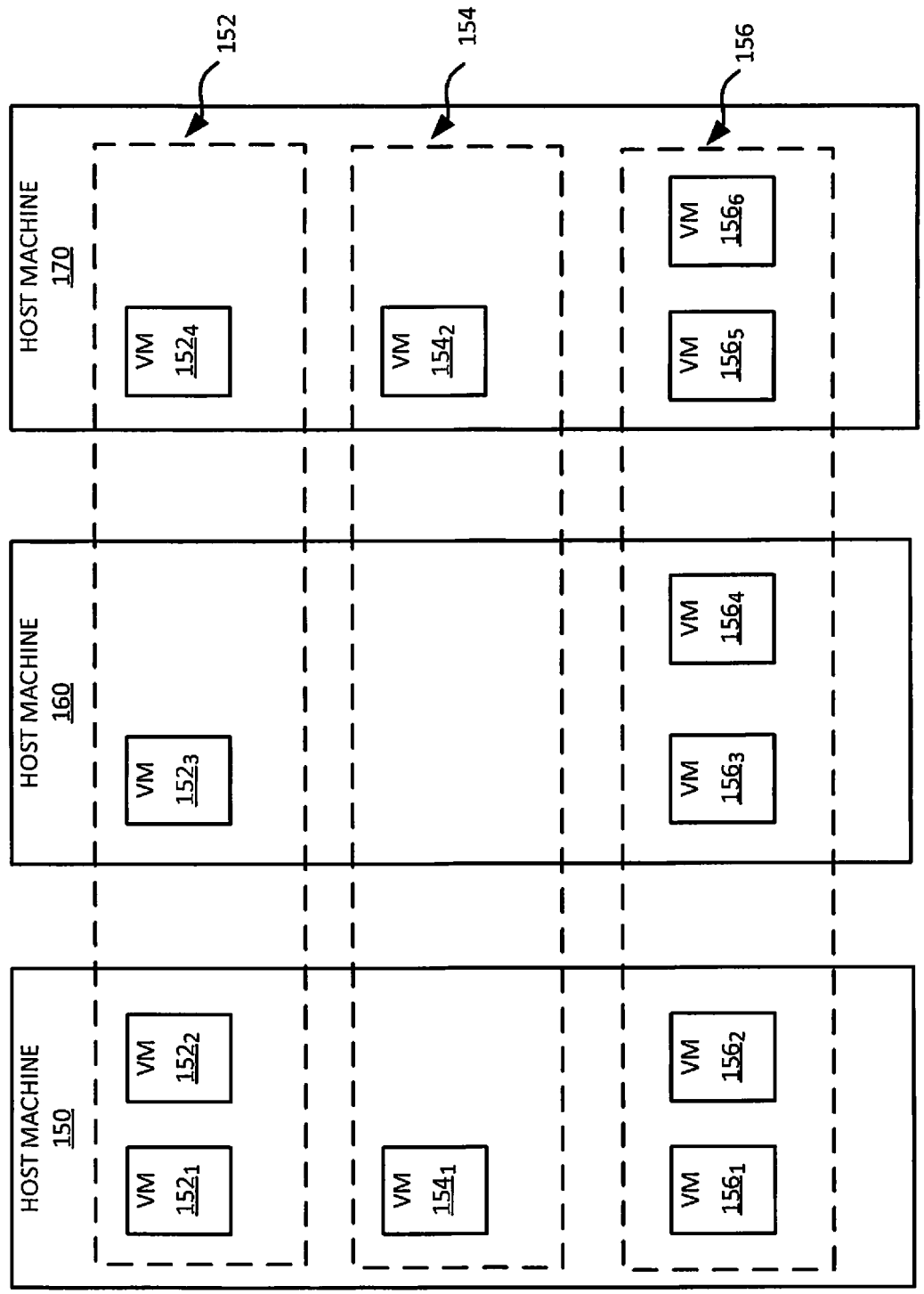
FIG. 1B is a block diagram of VM clusters spread across multiple host machines.

A VM cluster could also be spread across more than one host machine. FIG. 1B is a block diagram of VM clusters spread across multiple host machines. VM cluster 152 comprises four VMs $152_1 \ldots 152_4$ and is spread across host machines 150, 160 and 170 with VMs $152_1$ and $152_2$ running on host machine 150, VM $152_3$ running on host machine 160 and VM $152_4$ running on host machine 170.

VM cluster 154 comprises two VMs $154_1$ and $154_2$ and is spread across host machines 150 and 170. VM cluster 156 comprises six VMs $156_1 \ldots 156_6$ spread across host machines 150, 160 and 170.

Examples of security applications that could run on VMs such as any of the VMs $130_1 \ldots 130_M$ and $140_1 \ldots 140_L$ of FIG. 1A and/or any of the VMs $152_1 \ldots 152_4$, $154_1$ and $154_2$, and $156_1 \ldots 156_6$ in FIG. 1B include firewalls, Intrusion Detection Systems (IDS), Intrusion Prevention Systems and Network Security Monitors One architecture for implementing network security is the "virtual wire" approach. In this approach the security appliance is placed at the boundary between two different security zones and the security zones connect to each other through a virtual wire comprising the security appliance.

FIG. 1C is a block diagram depicting an example virtual wire implementation in a communications network. Virtual wire 100 comprises connections 110 and 120 and security control point 102. Security control point 102 is positioned between packet routers 104 and 106 and all packet traffic travelling between routers 104 and 106 passes through security control point 102. Router 104 is in a first security zone and router 106 is in a second security zone. A security zone is a collection of networked hosts (e.g. servers, user workstations) with a common set of access security policies. Connections 110 and 120 provide connectivity between security control point 102 and routers 104 and 106, respectively. Connections 110 and 120 could be any of various types of wired or wireless connection media used to implement network connectivity, including optical fiber, co-axial cable, twisted pairs, Wi-Fi, wireless, microwave connectivity or any combination thereof.

In one embodiment, router 106 is a gateway router placed at the perimeter of a private network such as a Local Area Network (LAN) and router 104 could be at an Internet Service Provider or an internet exchange peering point. In this embodiment, virtual wire 100 connects the two different networks and security control point 102 could protect the private network from attacks from the Internet.

FIG. 1C is an example only and other placements of a virtual wire are possible. For example, routers 104 and 106 could both be inside a corporate network. Router 104 could be inside one corporate security zone, router 106 could be inside a different corporate security zone, and virtual wire 100 could be placed between them. In this case, security control point 102 could protect each security zone from attacks originating in the other security zone.

In another example, router 106 could be inside a data center and router 104 could be at an Internet Service Provider or an internet exchange peering point. The data center could have multiple tenants, each with their own security policies. The virtual wire 100 could connect the data center to the internet and security control point 102 could enforce different security policies for different data center tenants.

A virtual wire could connect other types of network nodes instead of routers. For example, an Ethernet switch or a PC (Personal Computer) could be connected to another component by a virtual wire.

In general, virtual wire 100 connects two different network nodes in two different security zones and security control point 102 mitigates attacks on one security zone, and potentially either security zone, from the other security zone.

Virtual wire 100 is bidirectional. A packet can enter security control point 102 at its "A" side from router 104 and exit from the security control point's "Z" side to router 106. A packet can also enter security control point 102 at its "Z" side from router 106 and exit from the "A" side to router 104. Packets can never, however, enter and exit from the same side (e.g. enter and exit security control point 102 at its "A" side).

Security control point "sides" referenced herein are intended solely to refer to logical rather than physical sides of the security control point and illustrate different directions of packet flow. For example, an interface to receive or transmit packet traffic need not be located at a physical side of a security control point. Also, "A" side and "Z" side traffic could be received by physically adjacent receive interfaces that are not located at different physical sides of a security control point, or even by a single physical interface that receives multiplexed incoming traffic for both "A" to "Z" and "Z" to "A" traffic flow directions. Similarly, "A" side and "Z" side transmit interfaces need not be located at physically different sides of a security control point, or a single transmit interface could be used to transmit outgoing multiplexed "A" side and "Z" side traffic from a security control point.

An important property of virtual wire 100 is that it is effectively "transparent" to the network nodes to which it is connected, which are routers 104 and 106 in the example shown, at and above the layer 2 data link layer of the OSI (Open Systems Interconnect) model. Packets traveling between router 104 and router 106 through virtual wire 100 do not require the IP (Internet Protocol) address of security control point 102 for routing purposes. Security control point 102 could be inserted into the network without requiring changes to routers 104 or 106 or to their routing protocol. Security control point 102 does not participate directly in any OSI layer 3 or higher addressing. For example, packets received at one of two interfaces in a two-interface security control point implementation are processed and, unless dropped by the security control point, are transmitted out the other of its two interfaces.

This feature could allow the security control point's operation and enforcement of access security to be done independently from the network's pre-existing communication infrastructure. For example, this feature could be exploited in embodiments of the present disclosure in which a system is interposed between a first network node and a second network node and is transparent to the first network node and the second network node at and above the layer 2 data link layer of the OSI model. In some embodiments a method may be implemented at such a system for handling packet flows between such network nodes.

Security Control Point

Security control point 102 could be designed to process packets at a rate equal to or greater than the maximum transmission rate between router 104 and 106 (known as the "line rate"). For example, if the communication path between router 104 and 106 is a 100 Gigabit (Gb) per second (Gbps) line then security control point 102 could be designed with enough processing power to process packets at a rate up to at least 100 Gbps. This property of line rate processing means that the placement of security control point 102 does not cause an unintentional reduction in the data transmission rate between routers 104 and 106.

A security control point could comprise an enforcement module and computing hardware such as a server or servers running a plurality of instances of a plurality of security applications. The security application instances could run on individual VMs hosted by the server(s), for example. The enforcement module could be a separate piece of hardware optimized or otherwise configured to classify packets and direct them to the various security applications.

Security Application Load Balancing

An enforcement module could comprise a Security Application Load Balancer (SALB). The SALB could be configured to distribute received packets across multiple instances of a security application for processing by the security application. The SALB could be configured to distribute the processing load between the multiple security application instances as evenly as possible (load balance).

Stateful Load Balancing

It could be desirable for the load balancing across security application instances to be "stateful". In stateful load balancing all packets in a packet flow are guaranteed to be sent to the same security application instance rather than potentially being distributed across multiple instances.

Stateful load balancing could minimize the disruption to communications caused by the removal or disable of a security application instance. Referring to FIG. 1A, if communication traffic is being statefully load balanced across the "M" instances of a security application $132_1 \ldots 132_M$ and one instance is removed or disabled (for example $132_1$) then any packet flow assigned to security instance $132_1$ could be disrupted. However, all other flows assigned to the remaining instances ($132_2 \ldots 132_M$) will not be disrupted as they will continue to be handled by the remaining security application instances to which they are assigned. If load balancing is not stateful then it is possible that some packets from different flows might be assigned to the removed or disabled security application instance. In this case it would be possible for all these flows to be disrupted, even if only a few of their packets had been sent to the removed or disabled security application instance.

A security application instance could be removed for any of several reasons. For example, the security application might need to be upgraded or replaced with a new version. In this case, to minimize traffic disruption, the security control point's security application instances could be removed one at a time and replaced with upgraded or new versions of the application. As another example, the number of security application instances might not be optimal. There could be too little traffic to justify the number of security application instances that are running. Each instance could incur a software license fee and the amount of traffic might not justify the expense. As another example, a security instance might require removal because it has stopped working and processing packets ("crashed").

To implement stateful load balancing a record could be kept of which security application instance the first packet in a flow is forwarded to and all subsequent packets in the same flow could be forwarded to the same security application instance. The record could be recorded in a flow database.

The flow database could comprise a plurality of entries wherein each entry comprises a flow identifier and a security application instance identifier. The security application instance identifier could identify the specific security application instance to which the flow is assigned.

A flow identifier identifies a particular flow. A flow identifier could be the flow key that characterizes the flow. The flow identifier could instead be created from hashing of the flow key. Hashing is a mathematical operation which maps data of arbitrary size to a fixed and usually smaller size. A flow identifier could be created in any of various ways, such as those described in pending U.S. patent application Ser. No. 16/129,125, entitled "METHODS AND SYSTEMS FOR NETWORK SECURITY UNIVERSAL CONTROL POINT", and filed on Sep. 12, 2018, the entire contents of which are incorporated herein by reference.

Bidirectional Stateful Load Balancing

It could be advantageous for stateful load balancing to operate on bidirectional flows and for an SALB to perform bidirectional stateful load balancing. In bidirectional stateful load balancing all packets in a bidirectional flow are passed to the same security application instance by the load balancer(s). Bidirectional stateful load balancing could be advantageous for certain types of security services, such as for example, Transport Layer Security (TLS) or Secure Socket Layer (SSL) decryption or firewalling.

Bidirectional stateful load balancing could also be advantageous from a security application instance loading perspective. The volume of data in a first unidirectional flow and its corresponding unidirectional return flow can be quite different. For example the data volume in a unidirectional flow consisting of a request for an image from a web site could be much smaller than the data volume of the corresponding return flow carrying the image. The data volume difference between the two flows could be more effectively averaged out if they are both sent to the same security application instance than if they were sent to different instances.

In one embodiment, packets that are part of a bidirectional packet flow between network security zones are received, and based on relative loading of identical instances of a security application running on a host machine, a determination is made as to one of the instances to which to assign the bidirectional packet flow for security processing. All of the received packets that are part of the bidirectional packet flow are directed for processing on the host machine by that one of the security application instances.

In bidirectional stateful load balancing a bidirectional flow identifier could identify a packet flow and its corresponding return flow. A record could be kept to track the security application instance to which the first packet in a bidirectional flow is forwarded to and all subsequent packets in the same bidirectional flow could be forwarded to the same security application instance. The record could be recorded in a flow database for example.

The flow database could comprise a plurality of entries wherein each entry comprises a bidirectional flow identifier and a security application instance identifier. The security application instance identifier could identify the specific security application instance to which the bidirectional flow is assigned.

The bidirectional flow identifier could be calculated based on a directionally symmetric hashing function, for example. The directionally symmetric hash function could be designed to produce identical hash values for all packets in a given bidirectional flow.

In an embodiment, a directionally symmetric hash function is based on transposition of a packet's address fields. Packets in a unidirectional flow and packets in the corresponding unidirectional return flow typically have their IP source and destination addresses transposed and their source and destination port numbers transposed. For example, the IP source address of the unidirectional flow is the IP destination address of the corresponding unidirectional return flow and the IP destination address of the unidirectional flow is the IP source address of the corresponding unidirectional return flow. Similarly, the source port number of the unidirectional flow is the destination port number of the corresponding unidirectional return flow and the destination port number of the unidirectional flow is the source port number of the corresponding unidirectional return flow. A directionally symmetric hash could be based on transposing the IP source and destination addresses and transposing the source and destination port numbers of a packet based on its direction of travel prior to computation of the hash.

Figure 1D:
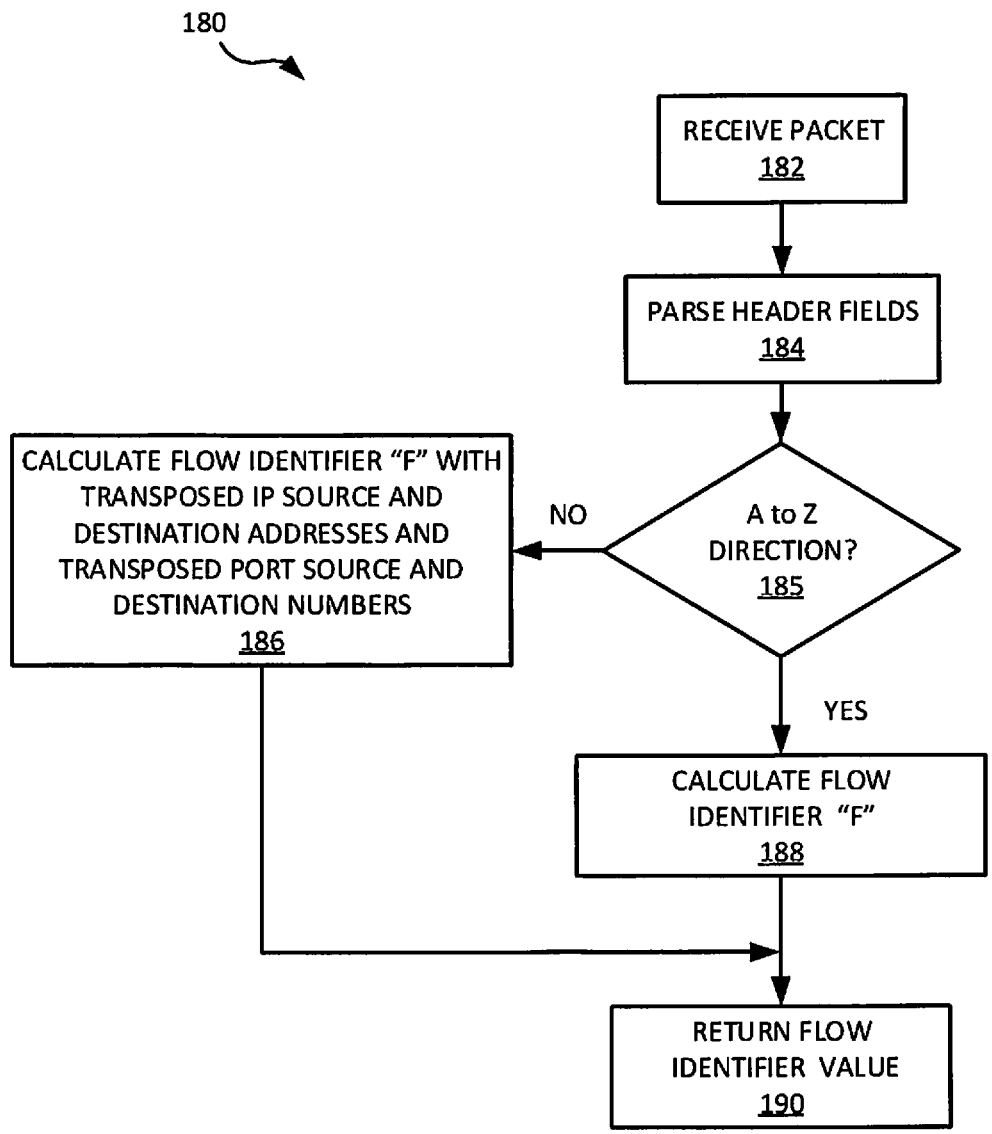
FIG. 1D is a flow diagram of an example directionally symmetric hash calculation method using transposition.

FIG. 1D is a flow diagram of an example directionally symmetric hash calculation method 180 using transposition. Such a method might be used by, for example, security control point 102 of FIG. 1C. At 182 a packet is received, and at 184 the packet's header is parsed into fields. At 185 the direction of the packet is determined. If the packet is traveling in the A to Z direction (YES at 185) then a flow identifier "F" is calculated at 188 from the packet's header fields using a hashing function. The flow identifier value is returned at 190. If the packet is not traveling in the A to Z direction (NO at 185) then at 186 a flow identifier "F" is calculated from the packet's header fields using the same hashing function as at 188 but with the IP source and destination addresses transposed and the port source and destination numbers transposed. The flow identifier value "F" is returned at 190.

Assignment Based on Loading and Round Robin

In a scaled out security architecture with multiple instances of a particular security application it could be advantageous for an SALB to distribute the processing load between the multiple security application instances as evenly as possible.

For example, referring to FIG. 1A, the SALB could assign a new bidirectional flow to one of the plurality of security application instances $130_1 \ldots 130_M$ based on the loading of all security instances $130_1 \ldots 130_M$.

In one embodiment a round robin algorithm is used to assign bidirectional flows to security application instances.

A single "round" of the algorithm could comprise the assignment, in turn, of new bidirectional flows to all "qualified" security application instances until all qualified instances have been assigned a bidirectional flow.

During a round a single bidirectional flow might be assigned to each qualified security application instance or multiple flows might be assigned to each qualified security application instances.

New bidirectional flows are bidirectional flows that have not yet been assigned a security application instance. A security application instance could be qualified to receive a new bidirectional flow based on its loading.

A round could also or instead have a fixed time period or duration. A single "round" of the algorithm could comprise the assignment, in turn, of new bidirectional flows to all qualified security application instances until the fixed time period has expired. The period could be, for example, one millisecond.

At the end of a round a new round could begin. The loading of the security application instances could be remeasured and security application instances could be requalified at the start of each new round.

Thus, determining the instance to which to assign a bidirectional packet flow may be based on a round, also referred to herein as an assignment round, in which one or more instances are available for assignment of one or more bidirectional packet flows. An assignment round may be time-limited to a time period, and in that case after the time period associated with a current assignment round expires one or more of the instances may be qualified as being available for assignment of a bidirectional packet flow in a next assignment round.

Security application instances could be qualified as being available for assignment of a bidirectional packet flow based on their loading relative to the average loading of all the security application's instances. Although security application instances may be qualified for the purposes of assignment rounds, qualification of security application instances is not limited only to embodiments in which assignment of bidirectional packet flows to security application instances involve assignment rounds. In general, some embodiments may involve qualifying one or more instances as being available for assignment of a bidirectional packet flow, and determining the instance to which to assign the bidirectional packet flow is to be assigned may then involve determining the instance from among the one or more of the instances qualified as being available for assignment of the bidirectional packet flow.

Qualifying instances as being available may be based on any of various parameters or characteristics, such as relative loading of all instances and/or individual loading of each instance.

For example, security application instances may be qualified based on individual loading of each instance relative to an average loading of the instances. In embodiments, only security application instances with an individual loading below the average loading of all security application instances could be qualified, or only security application instances with a loading below the average loading and a configurable margin term could be qualified. The margin term could be a positive value or a negative value.

Security application instances could be requalified periodically, such as at the start of every new round or after a plurality of rounds for example. Other requalification triggers or conditions are possible, and may be used in addition to or instead of round-based requalification.

Figure 1E:
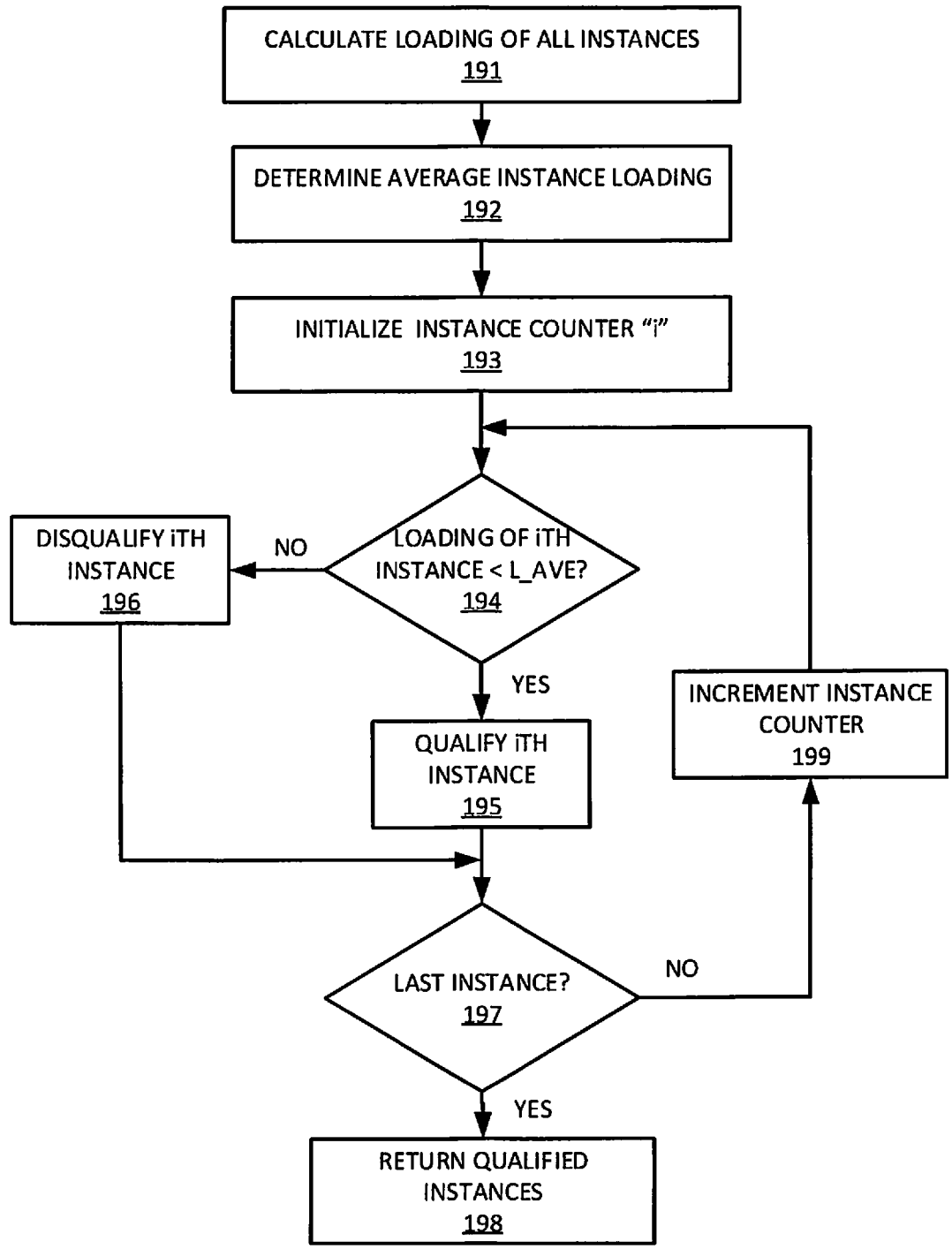
FIG. 1E is a flow diagram of an example security application instance qualification method.

FIG. 1E is a flow diagram of an example security application instance qualification method. At 191 individual loadings of all security application instances that are to be load balanced are calculated. At 192 an average instance loading is calculated. At 193 an instance counter "i" is initialized. At 194 the loading of the i-th instance is compared to the average instance loading (L_AVE). If the loading of the i-th instance is less than the average instance loading (YES at 194) then at 195 the i-th instance is qualified as being available to receive and process a further packet flow. If the loading of the i-th instance is not less than the average instance loading (NO at 194) then at 196 the i-th instance is disqualified from receiving and processing a further packet flow. At 197 it is determined whether the i-th instance was the last remaining instance to be evaluated. If the i-th instance was the last remaining instance (YES at 197) then at 198 a list of qualified instances is returned. If the i-th instance was not the last instance (NO at 197) then at 199 the instance counter is incremented and operations are repeated as shown.

Other qualification methods are possible. For example, security application instances could be qualified based on their individual loading relative to a loading limit. A security application instance could be qualified if its loading is below a loading limit and disqualified if its loading is greater than or equal to the loading limit.

The loading of a security application instance could be calculated from its state ("S"). For example, the loading "L" of an instance could be calculated using the formula $$L=G(S)$$

where "G" is a loading function.

The state "S" could comprise any of different loading metrics for the security application instance. For example, "S" could be a vector quantity such that $$S=(S_1, S_2, \ldots S_Q)$$

where $S_1 \ldots S_Q$ could represent different loading metrics associated with individual loading a security application instance. In general, one or more loading metrics associated with individual loadings of security application instances may be determined.

A loading metric could characterize a specific operational aspect of the security application instance. For example, one of $S_1 \ldots S_Q$ could represent a count of bidirectional flows the security application instance is currently handling, a rate at which the security application instance is receiving new bidirectional flows (flow rate), a rate at which it is receiving packets (packet rate) or a rate at which it is receiving bytes of information (byte rate).

Loading metrics $S_1 \ldots S_Q$ could be calculated by the SALB itself and might not require any communication with the security application instances, their VMs or the host machine(s) hosting them. This could be advantageous in terms of avoiding any latency or delay in the measurements. It could also be advantageous in terms of not burdening the host machine, VMs, or security applications with additional duties.

Loading metrics $S_1 \ldots S_Q$ could also or instead characterize operational aspects of the VM running the security application instance. For example, loading metrics could indicate or represent such operational aspects as memory utilization, CPU utilization or disk utilization of a VM. They might also indicate or represent through packet latency of a VM (the time delay between the arrival of a packet at the VM and its exit from the VM). These values could be average values and the averages could be time weighted averages, for example.

The SALB could measure the through packet latency of a security application instance by, for example, periodically sending a test packet to the security application instance and measuring a time at which the test packet is sent to the instance and a time at which the test packet is returned to the SALB. Through packet latency can then be determined based on the measured times. Another possible option is to start a timer when a test packet is sent to the security application instance and stopping the timer when the test packet is returned to the SALB. Other ways to measure or otherwise determine through packet latency are also possible.

The loading function "G" could be a weighted sum of the loading metrics $S_1 \ldots S_Q$. For example, there could be a plurality of weights $W_1 \ldots W_Q$ and the loading "L" could be calculated using the formula $$L=W_1 S_1 + W_2 S_2 + \ldots W_Q S_Q$$

Weights $W_1 \ldots W_Q$ could be programmable in one embodiment.

The data structures used to capture loading metrics $S_1 \ldots S_Q$ could be a combination of simple counters and leaky integrators. For example, a simple counter could track a count of bidirectional flows currently being handled by a particular security instance. The counter could be incremented when a new bidirectional flow is assigned to an instance and decremented when a flow has ceased. A leaky integrator could model instantaneous rate measurements by approximating the average quantity of a particular value, e.g. bytes, over a configurable window of time.

These are illustrative examples of how security application instances may be qualified to be assigned a new packet flow, or disqualified from being assigned a new packet flow. Other embodiments are possible.

Random Early Discard/Allowance

To reduce the likelihood of overloading of a security control point and its security application instances, in some embodiments bidirectional packet flows could be discarded and/or allowed based on any of one or more parameters or characteristics such as the average loading of all instances. For example, as the average loading approaches a loading threshold a bidirectional packet flow could be randomly discarded by the SALB and not passed to the security application instances. All packets in the bidirectional flow could be discarded. The discard rate could be based on the average loading relative to the loading threshold. This could help prevent overloading the security control point and its security application instances.

Alternately, as the average loading approaches a loading threshold a bidirectional packet flow could be randomly allowed by the SALB and bypass the security application instances. For example, referring to FIG. 3, an allowed packet could be passed by SALB 302 directly to combiner 304 and exit security control point 300 without being processed by any of security application instances 312. All packets in the bidirectional flow could be allowed. The allowance rate could be based on the average loading relative to the loading threshold. This could help prevent overloading the security control point and its security application instances.

In one embodiment the SALB monitors the average through packet latency of its security application instances and randomly discards and/or allows bidirectional packet flows based on the proximity of the average through packet latency to a through packet latency threshold value. Through packet latency is another example of a parameters or characteristic based upon which bidirectional packet flows may be discarded or allowed.

These examples of threshold-based discarding or allowing of bidirectional packet flows each refer to a single threshold or threshold value, multiple thresholds or threshold values with respective associated different discard or allowance rates are possible.

Figure 2A:
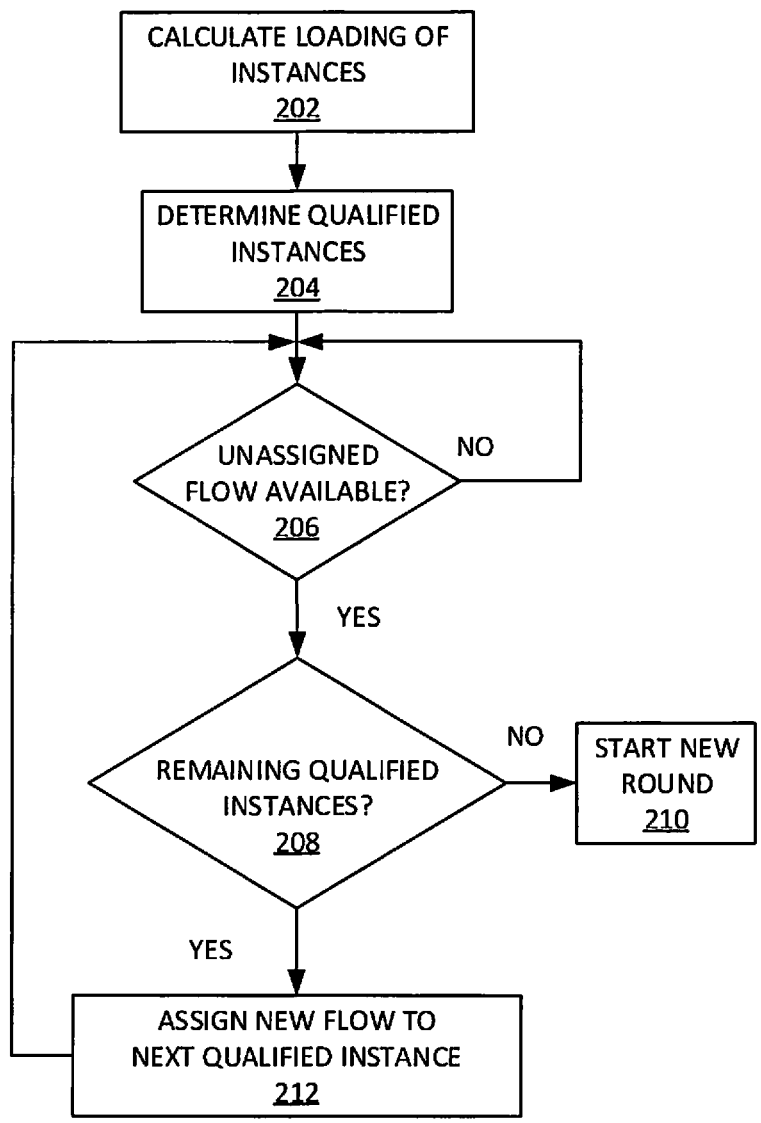
FIG. 2A is a flow diagram of an example round robin assignment method.

FIG. 2A is a flow diagram of an example round robin assignment method 200.

A new round begins at 202 with calculating loading of all security application instances, by an SALB for example. At 204 the qualified security application instances are determined. At 206 it is determined whether an unassigned bidirectional flow, which has not been assigned to a security application instance, is available for assignment to a security application instance. The "NO" branch at 206 is intended to represent a feature of re-checking or waiting for an unassigned new bidirectional flow when no unassigned flow is currently available. Such a re-checking or waiting feature may be provided in some embodiments.

If there is an unassigned bidirectional flow available (YES at 206) then at 208 it is determined whether there are any remaining qualified security application instances that have not been assigned a new bidirectional flow in the round. If there are no remaining qualified security application instances (NO at 208) then a new round begins at 210. If there are remaining qualified security application instances (YES at 208) then the new bidirectional flow is assigned to the next qualified security application instance at 212. At 206 it is again determined whether there is an unassigned bidirectional flow available.

Method 200 is an example only, and other embodiments are possible. For example, the loading of the security application instances might not be calculated on every assignment round and might only be calculated after a plurality of assignment rounds. In some embodiments, more than one unassigned bidirectional flow might be assigned to a security application instance on each round. For example, a plurality of bidirectional flows could be assigned to each instance on each round. An assignment procedure may end and be re-started if it is determined at 206 that no unassigned bidirectional flows are available. In another embodiment, unassigned bidirectional flow availability is determined before loading calculation and instance qualification, so that flow calculation and instance qualification are performed only when actually needed for flow assignment.

Figure 2B:
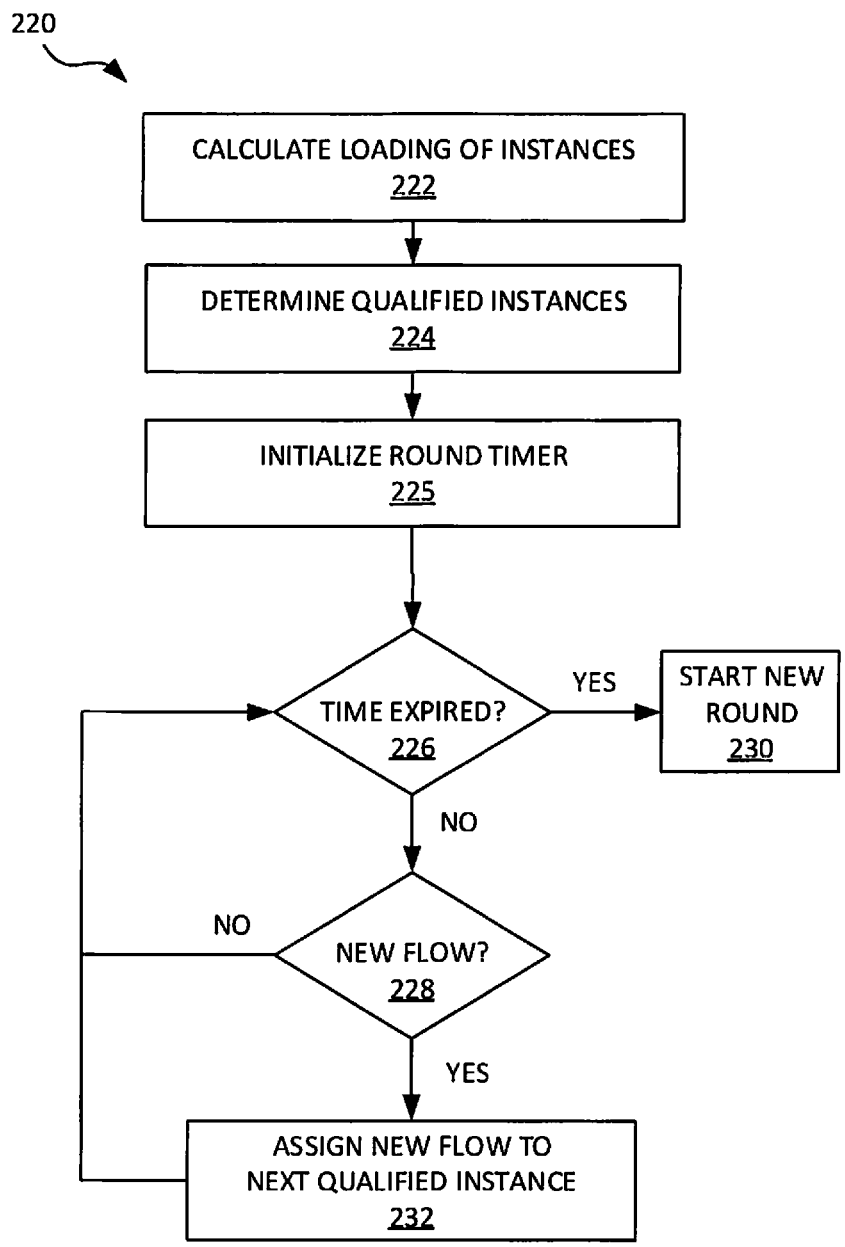
FIG. 2B is a flow diagram of another example round robin assignment method.

FIG. 2B is a flow diagram of another example round robin assignment method.

Each round of the example assignment method 220 could have a fixed time period or duration. A single "round" of the method comprises the assignment, in turn, of unassigned bidirectional flows to all "qualified" security application instances until the time period has expired.

At 222 a new bidirectional flow assignment round begins with calculating loading of all security application instances, by the SALB for example. At 224 qualified security application instances are determined. At 225 a timer for the round is initialized. At 226 it is determined whether the time period for the round has expired. If the time has expired (YES at 226) then a new round is started at 230. If the time period has not expired (NO at 226) then at 228 it is determined whether there is an unassigned bidirectional flow available. If there is no unassigned bidirectional flow available (NO at 228) then at 226 it is again determined if the time period has expired. If there is an unassigned bidirectional flow available (YES at 228) then the unassigned bidirectional flow is assigned to the next qualified security application instance at 232. At 226 it is again determined if the time period has expired.

Figure 3:
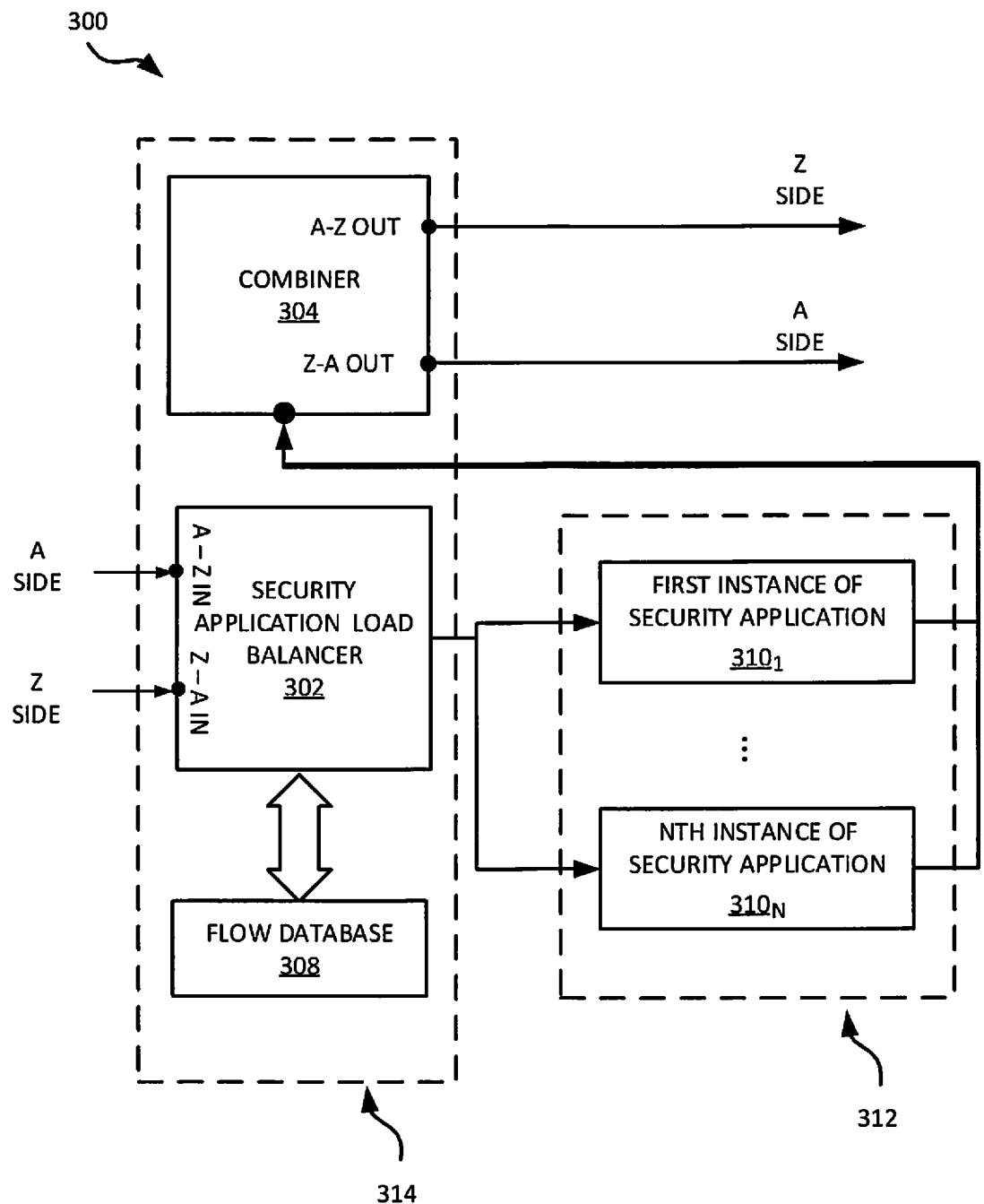
FIG. 3 is a block diagram of an example security control point.

FIG. 3 is a block diagram of an example security control point. Security control point 300 comprises enforcement module 314 and host machine 312. Host machine 312 could be implemented using computing hardware such as a server, for example. Host machine 312 hosts "N" instances $310_1 \ldots 310_N$ of a security application. Security application instances $310_1 \ldots 310_N$ could be hosted on multiple host machines as described previously.

Enforcement module 314 comprises SALB 302, combiner 304 and flow database 308 that would be stored in one or more memory devices. Enforcement module 314 could be implemented, for example, in a piece of custom hardware that is separate from the host machine 312 and that is optimized to classify packets and distribute them to security application instances $310_1 \ldots 310_N$.

Referring simultaneously to FIG. 3 and FIG. 1C, SALB 302 receives packets traveling in the A to Z direction at its A to Z input interface (A-Z IN) and receives packets traveling in the Z to A direction at its Z to A input interface (Z-A IN).

SALB 302 assigns bidirectional flows to security application instances $310_1 \ldots 310_N$ hosted on host machine 312 in a stateful manner, according to which all packets in any particular bidirectional flow are sent to the same one of security application instances $310_1 \ldots 310_N$. SALB 302 is coupled to the interfaces A-Z IN and Z-A IN, and is configured to determine one of the security application instances $310_1 \ldots 310_N$ running on host machine 312 to which to assign the bidirectional packet flow for security processing, and to direct all of the received packets that are part of the bidirectional packet flow for processing on the host machine by that particular one of the security application instances.

Packets traveling in the A to Z direction are processed by one of security application instances $310_1 \ldots 310_N$. If those packets are not being dropped or otherwise removed from a packet flow, then the packets are provided to and received by combiner 304 and are multiplexed onto the combiner's A-Z output interface (A-Z OUT). The output interface could be or include a physical interface such as an optical fiber or copper cable, or it could be or include a logical interface such as a Virtual Local Area Network (VLAN). Packets traveling in the A to Z direction could then be transmitted over a connection, such as connection 120 in FIG. 1C, to a device attached to the security control point's Z-side, such as router 106 of FIG. 1C for example.

Packets traveling in the Z to A direction are also processed by one of security application instances $310_1 \ldots 310_N$ and if not being dropped or otherwise removed are received by combiner 304 and are multiplexed onto the combiner's Z to A output interface (Z-A OUT). The output interface could be or include a physical interface such as an optical fiber or copper cable, or it could be or include a logical interface such as a VLAN. Packets traveling in the Z to A direction could then be transmitted over a connection, such as connection 110 in FIG. 1C, to a device attached to the security control point's A-side, such as router 104 of FIG. 1C for example.

SALB 302 communicates with flow database 308 to, for example, determine whether a received packet is from a known flow that has been previously assigned to a security application instance $310_1 \ldots 310_N$ and/or to record the assignment of a new bidirectional flow to a security application instance.

Figure 4:
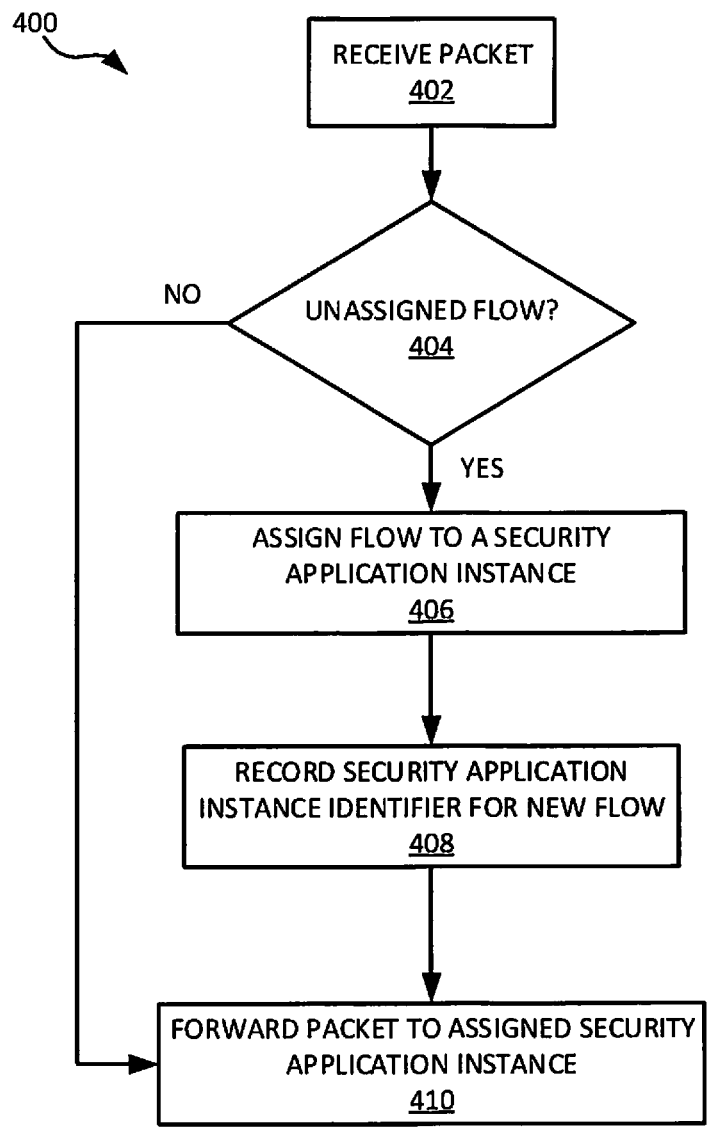
FIG. 4 is a flow diagram of an example stateful, bidirectional flow, load balancing method based on instance loading.

FIG. 4 is a flow diagram of an example stateful, bidirectional flow, load balancing method 400 based on instance loading.

At 402 a packet is received, by an SALB such as SALB 302 of FIG. 3 for example. The identity of the packet's flow could be determined at 402 by, for example, calculating a bidirectional flow identifier or a bidirectional flow identifier could have previously been appended to the packet and the SALB could read its value. As an example, a bidirectional flow identifier calculation could use the symmetric hash calculation method of FIG. 1D.

At 404 the SALB could determine whether the packet is from an unassigned bidirectional flow which has not been assigned to a security application instance or is from a known bidirectional flow that has been assigned to a security application instance. The SALB could search a flow database for a bidirectional flow identifier to make this determination.

If the packet is from an unassigned bidirectional flow for which there is no assigned security application instance (YES at 404) then at 406 the packet's bidirectional flow is assigned a security application instance from the available security application instances. This assignment by a SALB could be based on the relative loading of the security application instances. For example, the SALB could be configured to handle assignment of bidirectional packet flows to instances using the round robin assignment method of FIG. 2A or FIG. 2B, or another method disclosed herein.

At 408 an identifier of the security application instance to which the bidirectional flow was assigned at 406 is recorded. Assignment could involve recording the packet's bidirectional flow identifier and the security application instance identifier of its assigned security application instance in a flow database in memory, such as the flow database 308 in FIG. 3.

At 410 the packet is forwarded to its assigned security application instance, for example one of security application instances $310_1 \ldots 310_N$ of FIG. 3.

If the packet is not from an unassigned bidirectional flow (NO at 404) then the packet is from a flow that was previously assigned to a security application instance, and the packet is forwarded to that security application instance at 410.

A load balancer such as SALB 302 may be configured to provide other features, such as those described herein in the context of methods. For example, load may be configured to qualify one or more instances as being available for assignment of a bidirectional packet flow, and to determine the one instance to which to assign the bidirectional packet flow from among the one or more of the instances qualified as being available for assignment of the bidirectional packet flow. A load balancer may be configured to qualify instances based on any of various criteria, examples of which are provided elsewhere herein, including based on individual loading of each instance relative to an average loading of the instances or a loading limit, for example. As noted at least above, regarding average loading, each instance that has an individual loading that is below the average loading or below the average loading and a configurable margin term may be qualified in some embodiments.

A load balancer may also or instead be configured to determine, by measurement or otherwise, one or more loading metrics. Examples of loading metrics are also provided elsewhere, and include at least through packet latency and average through packet latency. One application of average through packet latency is in random discarding and/or allowing of packets based on the average through packet latency relative to a through packet latency threshold value.

Distributed Load Balancing

Load balancing could be a distributed function. A security control point could comprise multiple SALBs to assign bidirectional packet flows to multiple security application instances.

Figure 5:
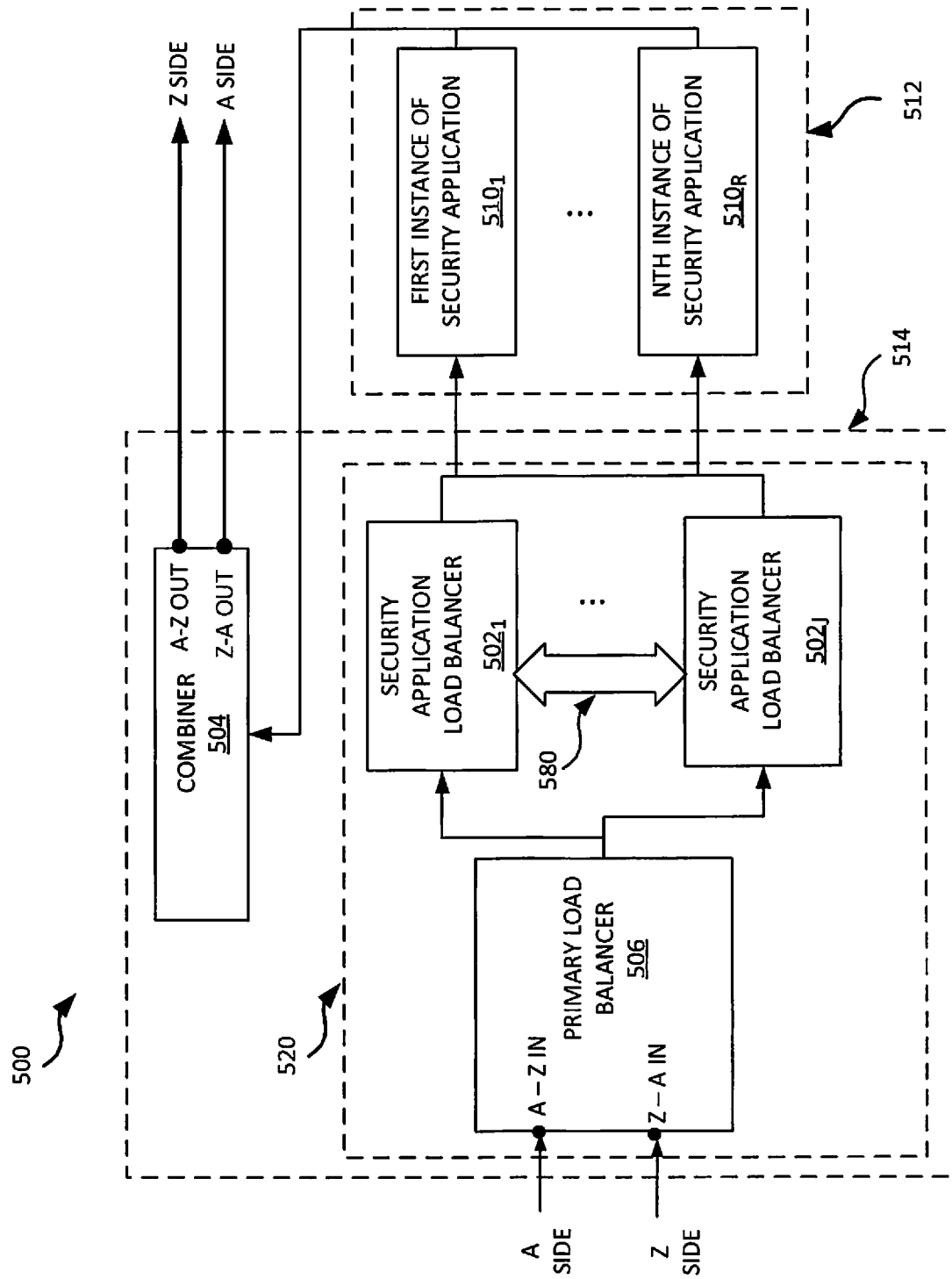
FIG. 5 is a block diagram of a security control point using distributed load balancing.

FIG. 5 is a block diagram of a security control point using distributed load balancing. Security control point 500 comprises enforcement module 514 and host machine 512. Host machine 512 could be implemented using computing hardware such as a server, for example. Host machine 512 hosts "R" instances $510_1 \ldots 510_R$ of a security application.

Enforcement module 514 comprises distributed load balancer 520 and combiner 504. Distributed load balancer 520 comprises primary load balancer 506, a plurality of SALBs $502_1 \ldots 502_J$ and communication channel 580. Each of SALBs $502_1 \ldots 502_J$ could maintain its own flow database in one or more memory devices. The flow databases have not been shown in FIG. 5 in order to avoid further congestion in the drawing. SALBs $502_1 \ldots 502_J$ communicate with each other over communication channel 580.

Communication channel 580 could be implemented using a proprietary, low overhead, high-speed serial protocol, for example. This protocol could synchronize serializer/deserializer (SERDES) links between SALBs $502_1$ and $502_2$ and provide a simple packet framing structure to share information between them. The information could include the loading metric updates on a packet-by-packet basis, as packets are received by either of SALBs $502_1$ or $502_2$. For example, when a packet is received on SALB $502_1$, a byte count update could be sent to its internal byte counter, and an update message could also be sent to SALB $502_2$ over communication channel 580 such that the byte counters in both devices should both receive the same updates and remain in synchronization with each other. Other types of communication channels are also possible.

Primary load balancer 506 and each of SALBs $502_1$ . . . $502_J$ could be implemented as individual integrated circuits, for example. In one embodiment they are implemented using individual FPGAs.

Primary load balancer 506 assigns bidirectional flows to SALBs $502_1$ . . . $502_J$ in a stateful manner. All packets in a particular bidirectional flow are sent to one and only one of SALBs $502_1$ . . . $502_J$. In one embodiment primary load balancer 506 maintains a record of the assignment of a bidirectional flow to one of SALBs $502_1$ . . . $502_J$, in a list or database in memory for example, but in other embodiments the primary load balancer does not maintain a record of SALB assignments.

Primary load balancer 506 receives packets traveling in the A to Z direction at its A-Z input interface (A-Z IN) and packets traveling in the Z to A direction at its Z to A input interface (Z-A IN).

SALBs $502_1$ . . . $502_J$ assign bidirectional flows to security application instances $510_1$ . . . $510_R$ in a stateful manner as described previously. All packets in a bidirectional flow are sent to one of security application instances $510_1$ . . . $510_R$.

SALBs $502_1$ . . . $502_J$ could determine the security application instance to which a new bidirectional flow is to be assigned based on the relative loading of all the security application instances as described previously.

Packets traveling in the A to Z direction are processed by one of security application instances $510_1$ . . . $510_R$ and if not being dropped or otherwise removed are received by combiner 504 and are multiplexed onto the combiner's A-Z output interface (A-Z OUT). The output interface could be or include a physical interface such as an optical fiber or copper cable, or it could be or include a logical interface such as a VLAN. Packets traveling in the A to Z direction could then transmitted over a connection, such as connection 120 in FIG. 1C, to a device attached to the security control point's Z-side, such as router 106 of FIG. 1C for example.

Packets traveling in the Z to A direction are processed by one of security application instances $510_1$ . . . $510_R$ and if not being dropped or otherwise removed are received by combiner 504 and are multiplexed onto the combiner's Z to A output interface (Z-A OUT). The output interface could be or include a physical interface such as an optical fiber or copper cable, or it could be or include a logical interface such as a VLAN. Packets traveling in the Z to A direction could then be transmitted over a connection, such as connection 110 in FIG. 1C, to a device attached to the security control point's A-side, such as router 104 of FIG. 1C for example.

FIG. 5 is illustrative of a system in which primary load balancer 506 is coupled to interfaces A-Z IN and Z-A IN and to SALBs $502_1$ . . . $502_J$ and is configured to receive packets associated with bidirectional packet flows, to determine for each bidirectional packet flow a respective SALB to which received packets associated with the bidirectional packet flow are to be directed, and to direct all of the received packets that are associated with each bidirectional packet flow to the respective SALB to which received packets associated with the bidirectional packet flow are to be directed.

Primary load balancer 506 could forward a packet to one of SALBs $502_1$ . . . $502_J$ based on a hash value calculated from one or more selected fields in the packet's header, for example. Primary load balancer 506 could calculate a packet's hash value using a directionally symmetric hash function, examples of which are provided elsewhere herein. The directionally symmetric hash function could be designed to produce identical hash values for all packets in a given bidirectional flow. This could ensure that all packets in a particular bidirectional flow are passed to one and only one of SALBs $502_1$ . . . $502_J$.

The flow databases maintained by each of SALBs $502_1$ . . . $502_J$ might not need to be synchronized with each other. Primary load balancer 506 sends all packets in a particular bidirectional flow to only one SALB, for example SALB $502_1$, and the remaining SALBs, including SALBs $502_2$ . . . $502_J$ in this example, will never handle packets from that specific bidirectional flow. The remaining SALBs therefore do not need to know the security application instance to which that bidirectional flow has been assigned.

The hash function based upon which packet flows are assigned in some embodiments could be chosen to cause bidirectional flows to be distributed by the primary load balancer 506 approximately equally and/or pseudo-randomly between SALBs $502_1$ . . . $502_J$.

A directionally symmetric hash function could be based on transposition of a packet's address fields, for example, as described elsewhere herein.

Packets in a unidirectional flow and packets in the corresponding unidirectional return flow typically have their IP source and destination addresses transposed and their source and destination port numbers transposed. For example, the IP source address of the unidirectional flow is the IP destination address of the corresponding unidirectional return flow and the IP destination address of the unidirectional flow is the IP source address of the corresponding unidirectional return flow. Similarly, the source port number of the unidirectional flow is the destination port number of the corresponding unidirectional return flow and the destination port number of the unidirectional flow is the source port number of the corresponding unidirectional return flow. A directionally symmetric hash could be based on transposing a packet's IP source and destination addresses and transposing its source and destination port numbers based on its direction of travel. Transposition could occur prior to computation of the actual hash.

In one embodiment there is a first SALB and a second SALB and a one bit hash is calculated from selected fields in the packet's header to distribute bidirectional flows approximately equally and pseudo-randomly between the first and second SALBs. For example, a hash value of "0" might result in the packet being forwarded to the first SALB while a hash value of "1" might result in the packet being forwarded to the second SALB. A hash function that is used in such an embodiment might be based on a Cyclical Redundancy Check (CRC) function for example.

Figure 6:
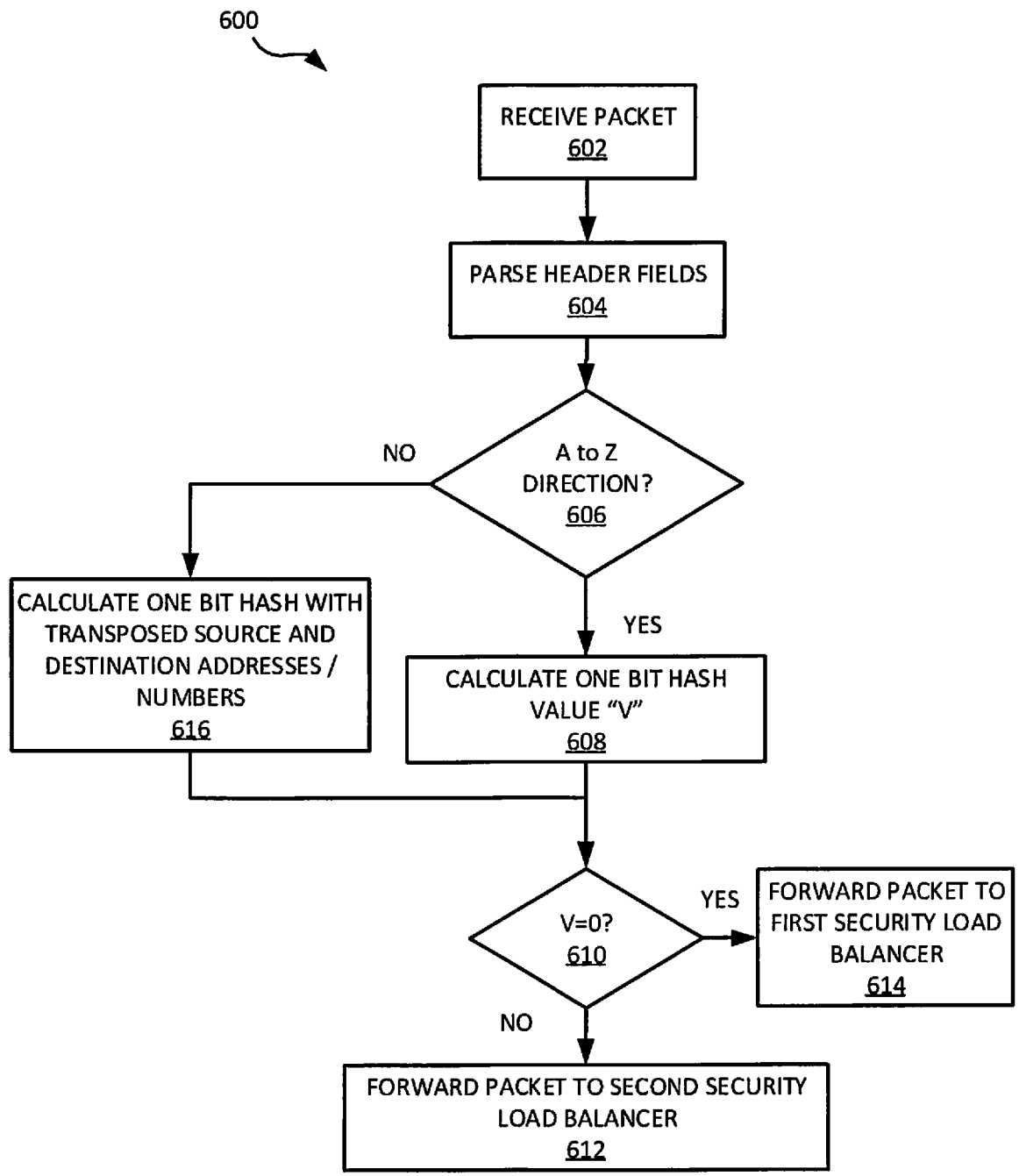
FIG. 6 is a flow diagram of another example directionally symmetric hash calculation method based on transposition.

FIG. 6 is a flow diagram of an example directionally symmetric hash calculation method 600 based on transposition. It might be used by primary load balancer 506 of FIG. 5 to distribute bidirectional flows between two SALBs, for example. At 602 a packet is received. At 604 the packet's header is parsed into fields. At 606 the direction of the packet is determined. If the packet is traveling in the A to Z direction (YES at 606) then a one bit hash value "V" is calculated at 608 from the packet's header fields. If the packet is not traveling in the A to Z direction (NO at 606) then at 616 a one bit hash value "V" is calculated from the packet's header fields using the same hashing function as at 608 but with the IP source and destination addresses transposed and the port source and destination numbers transposed. At 610 it is determined whether the value of "V" is equal to zero. If the value of "V" is equal to zero (YES at 610) then the packet is forwarded to the first SALB at 614. If the value of "V" is not equal to zero (NO at 610) then the packet is forwarded to the second SALB at 612.

To distribute bidirectional flows between "J" different SALBs a directionally symmetric hash that is $\log_2(J)$ bits long could be implemented, where J is power of two. For example, if there were 16 SALBs then a 4 bit hash could be used.

FIG. 6 is illustrative of a method in which determining a security application instance and directing received packets are implemented in each of multiple load balancers and packets associated with multiple bidirectional packet flows are received. For each bidirectional packet flow, a respective load balancer to which received packets associated with the bidirectional packet flow are to be directed is determined, and all received packets associated with each bidirectional packet flow are directed to the respective load balancer for that bidirectional packet flow.

In the example shown, the respective load balancer is determined based on a hash value. More generally, as noted elsewhere herein, a hash value may be calculated from one or more fields in a header of each received packet and based on a directionally symmetric hash function that produces identical hash values for all packets in a particular bidirectional packet flow.

Other variations are also possible, including using different hash values such as a hash value that is calculated based on a hash function to cause bidirectional flows to be distributed approximately equally and/or pseudo-randomly between load balancers.

Sharing of Loading Information between Distributed Load Balancers

SALBs could exchange information about the loading of security application instances over communication channel 580. For example, referring to FIG. 5, SALBs $502_1 \ldots 502_J$ could share loading information about the loading of security application instances $510_1 \ldots 510_R$ across communication channel 580. Loading information may be or include information such as one or more metrics associated with the individual loadings of security application instances $510_1 \ldots 510_R$ by each of the SALBs $502_1 \ldots 502_J$, for example.

This could allow SALBs such as SALB $502_1 \ldots 502_J$ to have a more complete measure of the state of each of their security application instances $510_1 \ldots 510_R$. For example, SALBs might communicate to each other any one or more of the loading metrics $S_1 \ldots S_Q$ mentioned previously and used to calculate the loading of a security application instance for each security application instance. For example, they could communicate the rate at which they send bidirectional flows (flow rate), send packets (packet rate) or send bits (bit rate) to each security application instance $510_1 \ldots 510_R$. This could allow SALBs $501_1 \ldots 502_J$ to have a more complete measure of the state of security application instances $510_1 \ldots 510_R$ and to better balance their loading.

The SALBs could also or instead communicate their determination of the loading "L" of each security application instance, and/or other information indicative of a determination by each SALB of the individual loading of a security application instance by that SALB.

With only two SALBs communication channel 580 could be a bidirectional bus, for example. Although such a bus could be used in other embodiments, with more than two SALBs a ring network topology could be preferred for communication channel 580, such that each SALB connects to exactly two other SALBs and each loading information update is passed around the ring and viewed by all SALBs.

The frequency of loading metric updates between SALBs could be at the packet rate, in one embodiment.

Each SALB could have its own copy of a loading database storing loading metrics or loading of all security application instances, by consequence of receiving state updates from all other SALB collections. For some loading metrics, separate states could be maintained internally for the local and external values, before being mixed together to determine the combined global loading values. In other cases, local and external values may be combined into a single global value as they all arrive (on-the-fly).

Sharing of loading information is not limited to system or apparatus embodiments. Such features may be implemented in other embodiments, including method embodiments.

Multiple Security Applications

A security control point or method could simultaneously support multiple, different security applications. For example, a security control point or method might support two or more of a firewall application, an intrusion detection application, an intrusion prevention application and a network security monitor.

Figure 7:
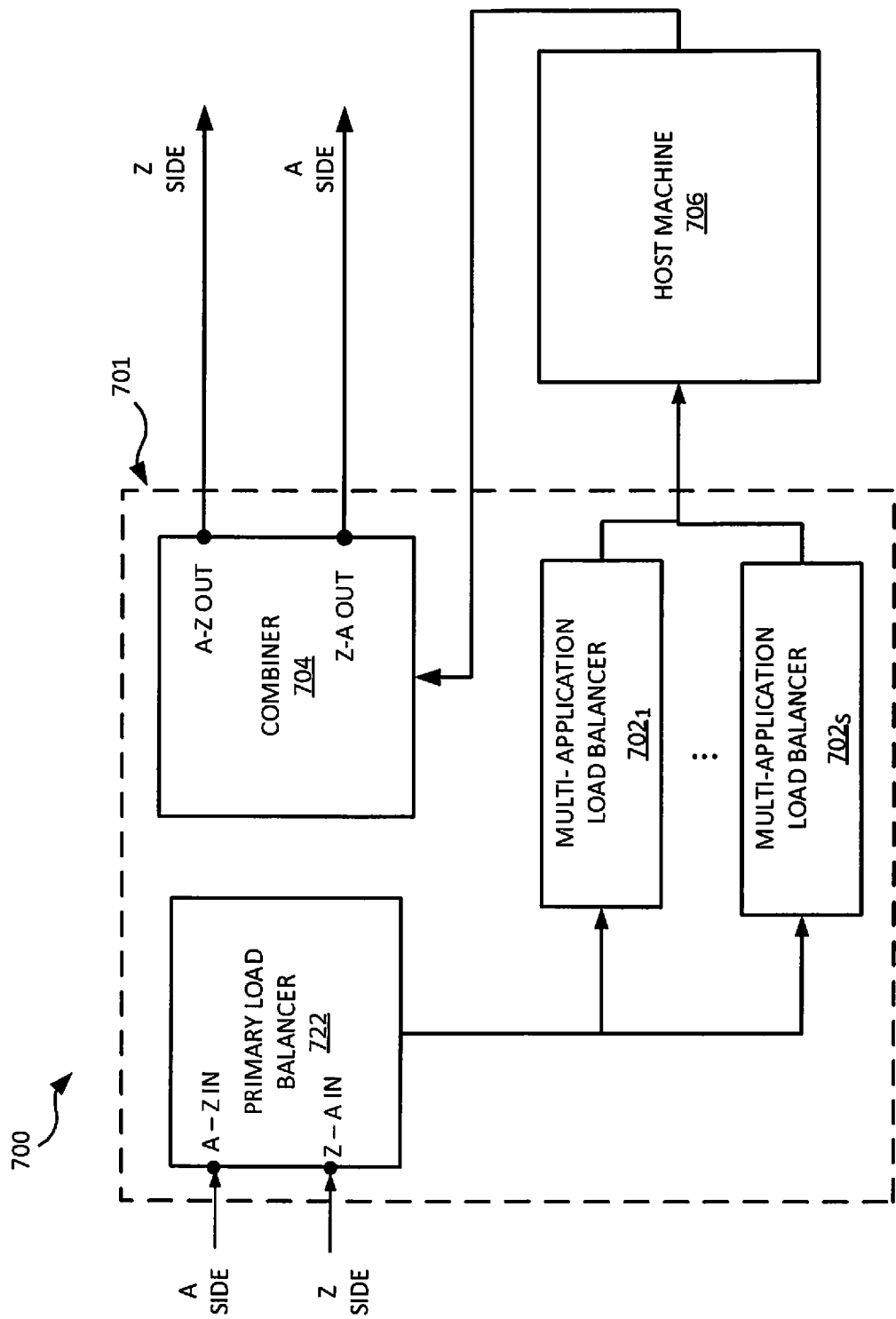
FIG. 7 is a block diagram of an example security control point supporting a plurality of different security applications.

FIG. 7 is a block diagram of an example security control point supporting a plurality of different security applications. Security control point 700 comprises enforcement module 701 and host machine 706.

Enforcement module 701 comprises primary load balancer 722, combiner 704, and plurality of multi-application load balancers (MALBs) $702_1 \ldots 702_S$. Implementation examples for load balancers and combiners are provided elsewhere herein, such as below with reference to FIG. 8 in respect of MALBs $702_1 \ldots 702_S$.

Host machine 706 could host a plurality of VM clusters. Each cluster could host a plurality of identical instances of a different security application as depicted in FIG. 1A, for example.

Referring simultaneously to FIG. 1C and FIG. 7, packets traveling in the A to Z direction are received at the A-Z input interface (A-Z IN) of primary load balancer 722. Packets traveling in the Z to A direction are received at the Z-A input interface (Z-A IN) of primary load balancer 722.

Primary load balancer 722 assigns bidirectional flows to MALBs $702_1 \ldots 702_S$ in a stateful manner, using directionally symmetric hashing as described previously in some embodiments. All packets in a bidirectional flow are sent to one and only one of MALBs $702_1 \ldots 702_S$.

Primary load balancer 722 could be a stateless load balancer and not maintain a record of the assignment of a bidirectional flow to a particular MALB.

MALBs $702_1 \ldots 702_S$ could assign bidirectional flows to a plurality of identical instances of different security applications hosted on host machine 706 in a stateful manner as described previously. All packets in a particular bidirectional flow are sent to one of a plurality of instances of a plurality of security applications.

MALBs $702_1 \ldots 702_S$ could determine the security application instance to which a new bidirectional flow should be assigned based on the relative loading of all the instances of that security application as described previously.

Packets traveling in the A to Z direction are processed by one of the security application instances hosted on host machine 706 (not shown) and if not being dropped or removed are received by combiner 704 and are multiplexed onto the combiner's A-Z output interface (A-Z OUT). Packets traveling in the A to Z direction could then be transmitted over a connection, such as connection 120 in FIG. 1C, to a device attached to the security control point's Z-side, such as router 106 of FIG. 1C for example.

Packets traveling in the Z to A direction are processed by one of the security application instances on host machine 706 and if not being dropped or removed are received by combiner 704 and are multiplexed onto the combiner's Z to A output interface (Z-A OUT). Packets traveling in the Z to A direction could then be transmitted over a connection, such as connection 110 in FIG. 1C, to a device attached to the security control point's A-side, such as router 104 of FIG. 1C for example. The output interfaces of combiner 704 could be or include a physical interface such as an optical fiber or copper cable, or it could be or include a logical interface such as a VLAN.

Figure 8:
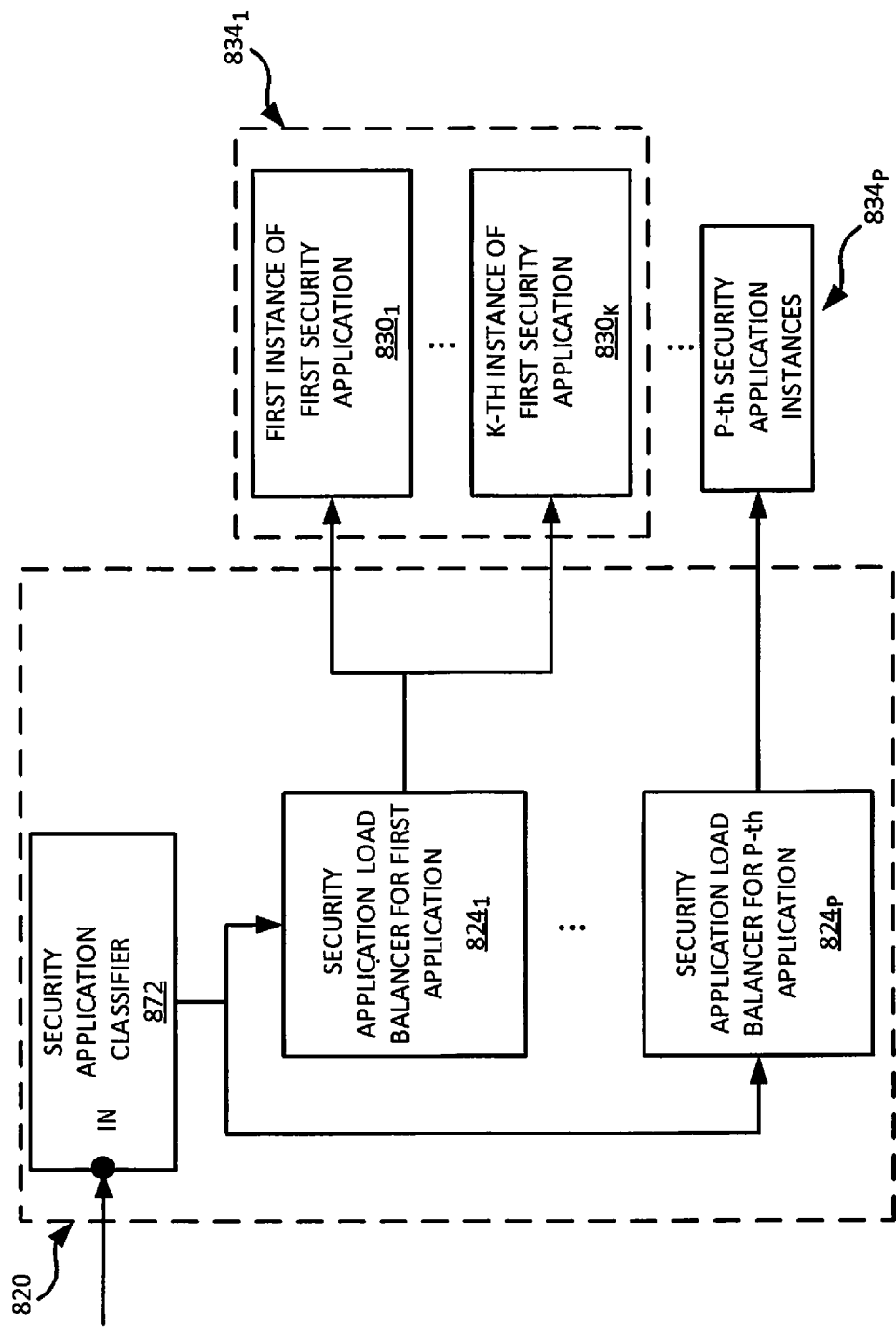
FIG. 8 is a block diagram of a Multiple Application Load Balancer.

FIG. 8 is a block diagram of a Multiple Application Load Balancer. MALB 820 comprises security application classifier 872 and SALBs $824_1 \ldots 824_P$.

Security application classifier 872 receives bidirectional flows at its input interface (IN), from primary load balancer 722 of FIG. 7 for example.

Security application classifier 872 could classify a received packet according to the security application by which it is to be processed, and forward the packet to the SALB(s) responsible for load balancing that security application (one of SALBs $824_1 \ldots 824_P$).

Rules for packet classification are programmable in some embodiments. Rules used by security application classifier 872 could be based on one or a combination of a packet's characteristics. These could include, for example, any one or more of: its destination IP address, source IP address, TCP/UDP (User Datagram Protocol) destination or source port, TCP header flags, packet length, ICMP (Internet Control Message Protocol) type, ICMP code, IPv4 protocol number, IPv4 DSCP (Differentiated Services Code Point), IPv4 fragment flags, IPv6 protocol number, IPv6 traffic class.

Packets could also or instead be classified according to other contextual information such as, for example the packet's ingress network interface (10G Physical Port 3 or VLAN sub-interface 145 on Physical Port 7 for example), the time of day the packet arrived or an externally tracked flow state (the flow has been allowed by a firewall, the packet is related to a flow allowed by a firewall, a synchronize request has been received for this flow, for example).

In one embodiment, one or more of the security zones to which a security control point connects includes multiple tenants. An example of such a security zone is a multi-tenancy data center which could be connected through the security control point to an internet service provider or an internet exchange peering point. Each SALB $824_1 \ldots 824_P$ may be associated with a respective tenant, and security application classifier 872 may classify packets and be configured to determine the security application by which each bidirectional packet flow is to be processed based on the tenant to which each bidirectional packet flow belongs. Similarly, in the context of a method, the determination of the one of the security applications by which each bidirectional packet flow is to be processed may be based on the tenant to which each bidirectional packet flow belongs.

For example, each tenant could have a specific IP address or set of addresses and security application classifier 872 could use a packet's destination IP address to classify the packet's tenancy in one direction and the packets source IP address in the other direction. In this embodiment, each tenant could specify the security application with which its packets are processed. For example, packets destined for a first tenant could be sent to a first security application load balancer (e.g. $824_1$ of FIG. 8). Packets destined for a second tenant could be sent to a different security application load balancer (e.g. $824_P$ of FIG. 8).

Tenants need not be separate commercial entities. For example, tenants could be different departments within a corporation. Tenants need not be physically located within a data center and could instead be in any commercial office space, campus or industrial park, for example.

Each of SALBs $824_1 \ldots 824_P$ load balances multiple instances of a different security application. For example, SALB $824_1$ load balances the "K" instances $830_1 \ldots 830_K$ of a first security application $834_1$, and SALB $824_P$ load balances all the instances (not separately shown in FIG. 8) of the P-th security application $834_P$.

SALBs $824_1 \ldots 824_P$ could assign bidirectional flows to the multiple instances of their respective security applications in a stateful manner as described previously. All packets in a particular bidirectional flow could be assigned to one of a plurality of instances of their respective security applications. For example, SALB $824_1$ could send all packets in a bidirectional flow that it receives to one of first security application instances $830_1 \ldots 830_K$.

SALBs $824_1 \ldots 824_P$ could determine to which instance of their respective security applications $834_1 \ldots 834_P$ an unassigned bidirectional flow should be assigned, based on the relative loading of all instances of the security application as discussed previously, for example.

The example shown in FIG. 8 is illustrative of a system in which each one of multiple load balancer $824_1 \ldots 824_P$ is associated with a respective one of multiple security applications. Classifier 872 is coupled to an interface and to the load balancers, to receive from the interface packets associated with bidirectional packet flows, to determine for each bidirectional packet flow a respective one of the security applications by which the bidirectional packet flow is to be processed, and to send all of the received packets that are associated with each bidirectional packet flow to the load balancer associated with the respective one of the plurality of security applications by which the bidirectional packet flow is to be processed. Similar features may be provided in method embodiments, in which determining an instance and directing received packets are implemented in each of multiple load balancers and the following operations are supported, for example: receiving packets associated with multiple bidirectional packet flows; determining for each bidirectional packet flow of the plurality of bidirectional packet flows a respective one of the security applications of the plurality of security applications by which the bidirectional packet flow is to be processed; and sending all of the received packets that are associated with each bidirectional packet flow to the load balancer associated with the respective one of the plurality of security applications by which the bidirectional packet flow is to be processed.

There may be SALBs in different MALBs which are load balancing instances of the same security application, and those SALBs could exchange information about their loading of the security application instances over a communication channel. For example, referring simultaneously to FIGS. 7 and 8, SALB $824_1$ in a first MALB (for example MALB $702_1$) and load balancing the K instances of a first security application $830_1 \ldots 830_K$ could share its loading information with a second SALB in a second MALB (for example MALB $702_S$ also load balancing the same K instances of first security application $830_1 \ldots 830_K$).

This could allow SALBs in different MALBs which are load balancing instances of the same security application to have a more complete measure of the state of each of their security application instances. For example, SALBs might communicate to each other any of the loading metrics $S_1 \ldots S_Q$ mentioned previously and used to calculate the loading of a security application instance. For example, SALBs could communicate the rate at which they send bidirectional flows (flow rate), send packets (packet rate) or send bits (bit rate) to each security application instance. This could allow SALBs in different MALBs which are load balancing instances of the same security application to have a more complete measure of the state of the security application instances and to better balance their loading.

The SALBs could also or instead communicate their determination of the loading "L" of each security application instance.

Primary load balancer 722, combiner 704 and MALBs $702_1 \ldots 702_S$ could be implemented in custom logic. The logic could be implemented in one or more Field Programmable Gate Arrays (FPGAs), for example. In one embodiment each of MALBs $702_1 \ldots 702_S$ is implemented in a separate FPGA.

Multiple Enforcement Modules

Although the example security control points described above include a single enforcement module, a security control point could comprise multiple enforcement modules. For example, a security control point could include multiple enforcement modules for multiple host machines such as multiple servers. Loading of the multiple enforcement modules could be load balanced by an enforcement module load balancer, and enforcement module load balancing could use any one or more of the load balancing techniques disclosed herein.

Switch-Based Architecture

Figure 9:
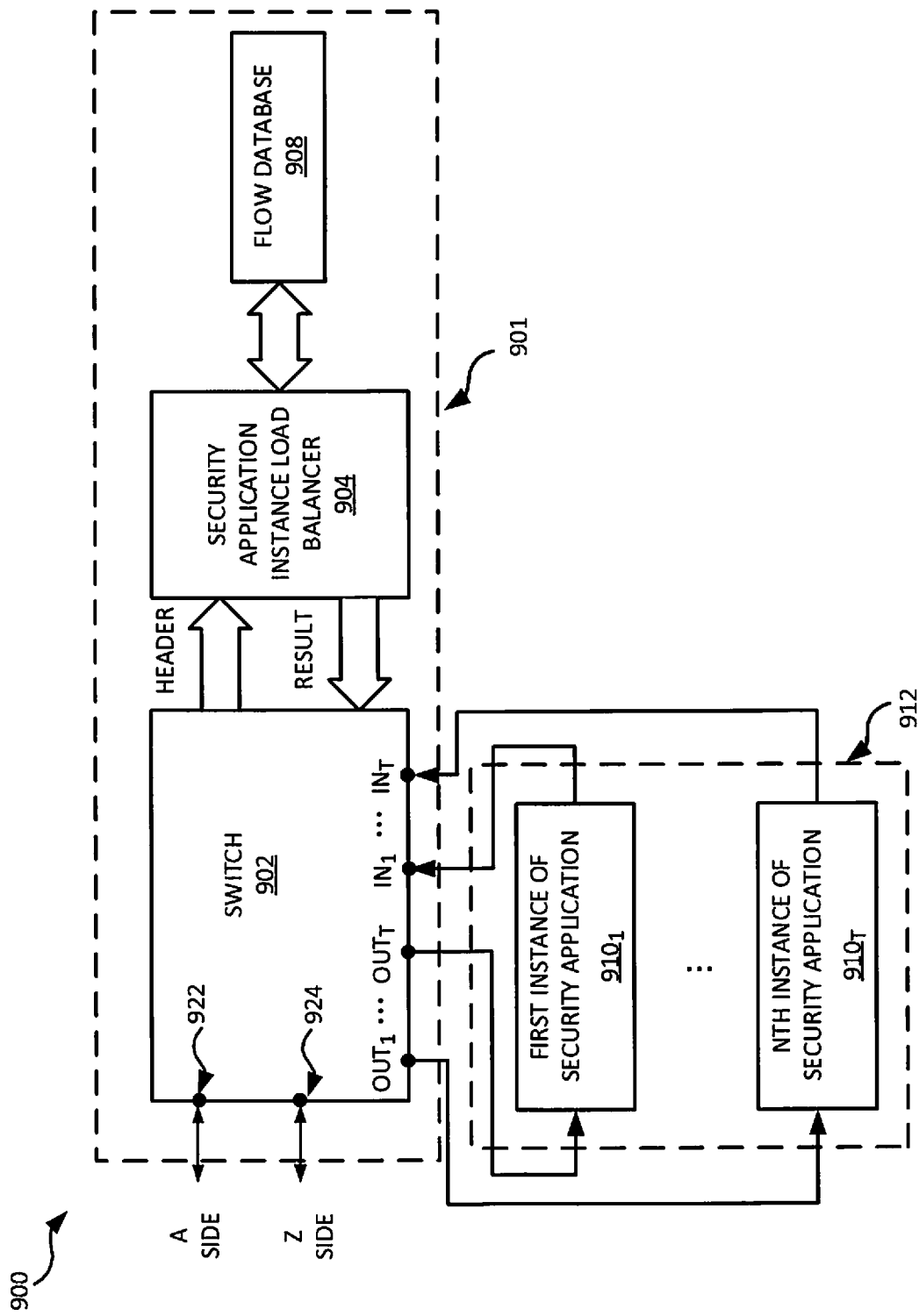
FIG. 9 is a block diagram of another example security control point

An SALB could receive the entire contents of a data packet or only selected portions of the packet such as, for example, the packet's header. FIG. 9 is a block diagram of another example security control point. Security control point 900 comprises enforcement module 901 and host machine 912.

Enforcement module 901 comprises packet switch 902, SALB 904 and flow database 908.

Packet switch 902 comprises bidirectional interfaces 922 and 924, a plurality of input interfaces $IN_1 \ldots IN_T$ and a plurality of output interfaces $OUT_1 \ldots OUT_T$. Packet switch 902 could be an Application Specific Integrated Circuit (ASIC), for example, and could switch packets received at either of I/O interfaces 922 and 924 to any of output interfaces $OUT_1 \ldots OUT_T$. It could also switch packets received at any of input interfaces $IN_1 \ldots IN_T$ to either of I/O interfaces 922 and 924.

Packet switch 902 could be a general purpose packet switch, input interfaces $IN_1 \ldots IN_T$ and output interfaces $OUT_1 \ldots OUT_T$ could be general purpose input/output interfaces, and packet switch 902 could be capable of switching packets received at any one of interfaces $IN_1 \ldots IN_T$, $OUT_1 \ldots OUT_T$, 922 and 924 to any other interface.

Example implementations of the other components shown in FIG. 9 are provided elsewhere herein. Host machine 912 hosts a plurality of instances of a security application $910_1 \ldots 910_N$.

Referring simultaneously to FIG. 1C and FIG. 9, packets traveling in the A to Z direction are received at interface 922 of packet switch 902. Packets traveling in the Z to A direction are received at interface 924 of packet switch 902.

Packet switch 902 could send the header information of received a packet to SALB 904. SALB 904 could determine the one of security application instances $910_1 \ldots 910_T$ to which the packet should be sent and communicate the result of this determination to packet switch 902. Packet switch 902 forwards a received packet to one of security application instances $910_1 \ldots 910_T$ through one of output interfaces $OUT_1 \ldots OUT_T$ based on the determination of SALB 904.

SALB 904 could assign bidirectional flows to security application instances $910_1 \ldots 910_T$ in a stateful manner as described previously. All packets in a particular bidirectional flow could be sent to the same one of security application instances $910_1 \ldots 910_T$. SALB 904 could determine the assignment of a bidirectional flow to one of security application instances $910_1 \ldots 910_T$ based on their loading relative to the average loading of all the security application's instances. The loading of a security application instance could be calculated from its state ("S") as described previously, for example. Security SALB 904 could use an assignment technique such as any of the round robin assignment method described previously, including those based on a fixed time period round to assign bidirectional flows to security application instances $910_1 \ldots 910_T$.

Packets traveling in the A to Z direction are processed by one of security application instances $910_1 \ldots 910_T$ and if not being dropped or removed are received by packet switch 902 at one of input interfaces $IN_1 \ldots IN_T$ and are multiplexed onto the packet switch's bidirectional interface 924. Bidirectional interface 924 could be or include a physical interface such as an optical fiber or copper cable or it could be or include a logical interface such as a VLAN. Packets traveling in the A to Z direction could then be transmitted over a connection, such as connection 120 of FIG. 1C, to a device attached to the security control point's Z-side, such as router 106 of FIG. 1C for example.

Packets traveling in the Z to A direction are processed by one of security application instances $910_1 \ldots 910_T$ and if not being dropped or removed are received by packet switch 902 at one of input interfaces $IN_1 \ldots IN_T$ and are multiplexed onto the packet switch's bidirectional interface 922. Bidirectional interface 922 could be or include a physical interface such as an optical fiber or copper cable or it could be or include a logical interface such as a VLAN. Packets traveling in the Z to A direction could then be transmitted over a connection, such as connection 110 of FIG. 1C, to a device attached to the security control point's A-side, such as router 104 of FIG. 1C for example.

FIG. 9 is illustrative of an embodiment in which a packet switch is coupled to an interface and to a load balancer, and the load balancer is configured to control the packet switch to direct received packets for processing on a host machine. Similar features may be provided by a method in which directing received packets involves controlling a packet switch to direct the received packets for processing on the host machine.

FIG. 9 is an example only and other security control point configurations are possible. For example, packet switch 902 could be combined with multiple SALBs to support distributed security application load balancing as discussed previously. Packet switch 902 could be combined with multiple MALBs to support distributed security application load balancing of multiple security applications. A switch-based architecture could also or instead be implemented in conjunction with other embodiments.

Conclusion

Numerous modifications and variations of the present disclosure are possible in light of the above teachings. It is therefore to be understood that within the scope of the appended claims, the disclosure may be practiced otherwise than as specifically described herein.

The divisions of functions represented in the drawings, for example, are solely for illustrative purposes. Other embodiments could include fewer, more, and/or different components than explicitly shown, interconnected in the same or a different order. For example, apparatus components may be configured to perform or enable any of various operations that are disclosed herein, in any of various combinations. Methods could similarly include fewer, more, and/or different operations performed in a similar or different manner than explicitly described herein.

In addition, although described primarily in the context of apparatus and methods, other implementations are also contemplated, as instructions stored on a non-transitory processor-readable medium, for example. In an embodiment, a non-transitory processor-readable storage medium stores instructions which, when executed by a processor, cause the processor to perform a method for handling packet flows between a pair of network security zones in a communications network, and the method involves: receiving packets that are part of a bidirectional packet flow between the network security zones; determining, based on relative loading of a plurality of identical instances of a security application running on a host machine, one instance of the plurality of identical instances of the security application to which to assign the bidirectional packet flow for security processing; and directing all of the received packets that are part of the bidirectional packet flow for processing on the host machine by the one of the security application instances.

It should also be noted that features are not necessarily restricted only to any particular embodiments in the context of which those features are disclosed. For example, features disclosed in the context of a method may also or instead be implemented in apparatus and/or processor-readable medium embodiments.

The invention claimed is:

1. A system for handling packet flows between a pair of network security zones in a communications network, the system comprising:
   an interface to receive packets that are part of a bidirectional packet flow between the network security zones;
   a load balancer, coupled to the interface, to: determine, based on relative loading of a plurality of identical instances of a security application running on a host machine, one instance of the plurality of identical instances of the security application to which to assign the bidirectional packet flow for security processing; and to direct all of the received packets that are part of the bidirectional packet flow for processing on the host machine by the one of the security application instances,
   wherein the load balancer is configured to qualify one or more of the instances as being available for assignment of the bidirectional packet flow, and to determine the one instance to which to assign the bidirectional packet flow from among the one or more of the instances qualified as being available for assignment of the bidirectional packet flow,
   wherein the load balancer is configured to qualify the one or more of the instances based on individual loading of each instance of the plurality of identical instances relative to an average loading of the plurality of identical instances,
   wherein the load balancer is further configured to qualify each instance of the plurality of identical instances which has an individual loading that is below the average loading of the plurality of identical instances and a configurable margin term.

2. The system of claim 1, wherein the system is interposed between a first network node and a second network node wherein the system is transparent to the first network node and the second network node at and above the layer 2 data link layer of the Open Systems Interconnect model.

3. A system for handling packet flows between a pair of network security zones in a communications network, the system comprising:
   an interface to receive packets that are part of a bidirectional packet flow between the network security zones;
   a load balancer, coupled to the interface, to: determine, based on relative loading of a plurality of identical instances of a security application running on a host machine, one instance of the plurality of identical instances of the security application to which to assign the bidirectional packet flow for security processing; and to direct all of the received packets that are part of the bidirectional packet flow for processing on the host machine by the one of the security application instances,
   wherein the load balancer is configured to determine one or more loading metrics associated with individual loadings of the plurality of identical instances,
   wherein the one or more loading metrics comprises through packet latency.

4. The system of claim 3, wherein the load balancer is configured to determine an average through packet latency of the plurality of identical instances, and to randomly discard and/or allow bidirectional packet flows based on the average through packet latency relative to a through packet latency threshold value.

5. The system of claim 3, further comprising:
   a packet switch, coupled to the interface and to the load balancer,
   wherein the load balancer is configured to control the packet switch to direct the received packets for processing on the host machine by the one of the security application instances to which the bidirectional packet flow is assigned.

6. A system for handling packet flows between a pair of network security zones in a communications network, the system comprising:
   an interface to receive packets that are part of a bidirectional packet flow between the network security zones;

a load balancer, coupled to the interface, to: determine, based on relative loading of a plurality of identical instances of a security application running on a host machine, one instance of the plurality of identical instances of the security application to which to assign the bidirectional packet flow for security processing; and to direct all of the received packets that are part of the bidirectional packet flow for processing on the host machine by the one of the security application instances, wherein the load balancer is configured to determine the one instance to which to assign the bidirectional packet flow further based on an assignment round in which one or more instances of the plurality of identical instances of the security application are available for assignment of one or more bidirectional packet flows, wherein the assignment round is time-limited to a time period, wherein the load balancer is configured to qualify one or more of the instances as being available for assignment of the bidirectional packet flow in a next assignment round after the time period associated with a current assignment round expires.

7. A system for handling packet flows between a pair of network security zones in a communications network, the system comprising:

an interface to receive packets that are part of a bidirectional packet flow between the network security zones;
a load balancer, coupled to the interface, to: determine, based on relative loading of a plurality of identical instances of a security application running on a host machine, one instance of the plurality of identical instances of the security application to which to assign the bidirectional packet flow for security processing; and to direct all of the received packets that are part of the bidirectional packet flow for processing on the host machine by the one of the security application instances, wherein the load balancer comprises one of a plurality of load balancers, the system further comprising:
a primary load balancer, coupled to the interface and to the plurality of load balancers, to receive from the interface packets associated with a plurality of bidirectional packet flows, to determine for each bidirectional packet flow of the plurality of bidirectional packet flows a respective load balancer of the plurality of load balancers to which received packets associated with the bidirectional packet flow are to be directed, and to direct all of the received packets that are associated with each bidirectional packet flow to the respective load balancer to which received packets associated with the bidirectional packet flow are to be directed.

8. The system of claim 7, wherein the primary load balancer is configured to determine the respective load balancer to which received packets associated with each bidirectional packet flow are to be directed based on a hash value calculated from one or more fields in a header of each received packet, wherein the hash value is calculated based on a directionally symmetric hash function that produces identical hash values for all packets in a particular bidirectional packet flow.

9. The system of claim 7, wherein the load balancers of the plurality of load balancers are configured to exchange information associated with their individual loadings of the plurality of identical instances of the security application.

10. The system of claim 9, wherein the information associated with the individual loadings comprises one or more loading metrics, determined by each load balancer of the plurality of load balancers, associated with the individual loading of an instance of the plurality of identical instances by the load balancer.

11. The system of claim 9, wherein the information associated with loading comprises information indicative of a determination, by each load balancer of the plurality of load balancers, of the individual loading of an instance of the plurality of identical instances by the load balancer.

12. A system for handling packet flows between a pair of network security zones in a communications network, the system comprising:

an interface to receive packets that are part of a bidirectional packet flow between the network security zones;
a load balancer, coupled to the interface, to: determine, based on relative loading of a plurality of identical instances of a security application running on a host machine, one instance of the plurality of identical instances of the security application to which to assign the bidirectional packet flow for security processing; and to direct all of the received packets that are part of the bidirectional packet flow for processing on the host machine by the one of the security application instances wherein the load balancer comprises one of a plurality of load balancers, each load balancer of the plurality of load balancers being associated with a respective one of a plurality of security applications including the security application, the system further comprising:

a classifier, coupled to the interface and to the plurality of load balancers, to receive from the interface packets associated with a plurality of bidirectional packet flows, to determine for each bidirectional packet flow of the plurality of bidirectional packet flows a respective one of the security applications of the plurality of security applications by which the bidirectional packet flow is to be processed, and to send all of the received packets that are associated with each bidirectional packet flow to the load balancer associated with the respective one of the plurality of security applications by which the bidirectional packet flow is to be processed, wherein one of the security zones comprises multiple tenants, wherein each load balancer of the plurality of load balancers is associated with a respective tenant, wherein the classifier is configured to determine the one of the security applications of the plurality of security applications by which each bidirectional packet flow is to be processed based on the one of the tenants to which each bidirectional packet flow belongs.

13. A method for handling packet flows between a pair of network security zones in a communications network, the method comprising:

receiving packets that are part of a bidirectional packet flow between the network security zones;
determining, based on relative loading of a plurality of identical instances of a security application running on a host machine, one instance of the plurality of identical instances of the security application to which to assign the bidirectional packet flow for security processing;
directing all of the received packets that are part of the bidirectional packet flow for processing on the host machine by the one of the security application instances, the method further comprising:
qualifying one or more of the instances as being available for assignment of the bidirectional packet flow,
wherein the determining comprises determining the one instance to which to assign the bidirectional packet flow from among the one or more of the instances qualified as being available for assignment of the bidirectional packet flow,
wherein the qualifying comprises qualifying the one or more of the instances based on individual loading of each instance of the plurality of identical instances relative to an average loading of the plurality of identical instances,
wherein the qualifying further comprises qualifying each instance of the plurality of identical instances which has an individual loading that is below the average loading of the plurality of identical instances and a configurable margin term.

14. The method of claim 13, wherein the bidirectional packet flow is between a first network node and a second network node and wherein the method is implemented in a system that is transparent to the first network node and the second network node at and above the layer 2 data link layer of the Open Systems Interconnect model.

15. A method for handling packet flows between a pair of network security zones in a communications network, the method comprising:
receiving packets that are part of a bidirectional packet flow between the network security zones:
determining, based on relative loading of a plurality of identical instances of a security application running on a host machine, one instance of the plurality of identical instances of the security application to which to assign the bidirectional packet flow for security processing;
directing all of the received packets that are part of the bidirectional packet flow for processing on the host machine by the one of the security application instances,
the method further comprising:
determining one or more loading metrics associated with individual loadings of the plurality of identical instances,
wherein the one or more loading metrics comprises through packet latency.

16. The method of claim 15, further comprising:
determining an average through packet latency of the plurality of identical instances;
randomly discarding and/or allowing bidirectional packet flows based on the average packet latency relative to a through packet latency threshold value.

17. The method of claim 15, wherein the directing comprises controlling a packet switch to direct the received packets for processing on the host machine by the one of the security application instances to which the bidirectional packet flow is assigned.

18. A method for handling packet flows between a pair of network security zones in a communications network, the method comprising:
receiving packets that are part of a bidirectional packet flow between the network security zones;
determining, based on relative loading of a plurality of identical instances of a security application running on a host machine, one instance of the plurality of identical instances of the security application to which to assign the bidirectional packet flow for security processing;
directing all of the received packets that are part of the bidirectional packet flow for processing on the host machine by the one of the security application instances,
wherein the determining comprises determining the one instance to which to assign the bidirectional packet flow further based on an assignment round in which one or more instances of the plurality of identical instances of the security application are available for assignment of one or more bidirectional packet flows,
wherein the assignment round is time-limited to a time period, wherein the method further comprises:
qualifying one or more of the instances as being available for assignment of the bidirectional packet flow in a next assignment round after the time period associated with a current assignment round expires.

19. A method for handling packet flows between a pair of network security zones in a communications network, the method comprising:
receiving packets that are part of a bidirectional packet flow between the network security zones:
determining, based on relative loading of a plurality of identical instances of a security application running on a host machine, one instance of the plurality of identical instances of the security application to which to assign the bidirectional packet flow for security processing;
directing all of the received packets that are part of the bidirectional packet flow for processing on the host machine by the one of the security application instances,
wherein the determining and the directing are implemented in each of a plurality of load balancers, the method further comprising:
receiving packets associated with a plurality of bidirectional packet flows;
determining for each bidirectional packet flow of the plurality of bidirectional packet flows a respective load balancer of the plurality of load balancers to which received packets associated with the bidirectional packet flow are to be directed;
directing all of the received packets that are associated with each bidirectional packet flow to the respective load balancer to which the received packets associated with the bidirectional packet flow are to be directed.

20. The method of claim 19, wherein determining the respective load balancer to which received packets associated with each bidirectional packet flow are to be directed comprises determining the respective load balancer based on a hash value calculated from one or more fields in a header of each received packet, wherein the hash value is calculated based on a directionally symmetric hash function that produces identical hash values for all packets in a particular bidirectional packet flow.

21. The method of claim 19, further comprising:
exchanging, between the load balancers of the plurality of load balancers, information associated with individual loadings of the plurality of identical instances of the security application by the load balancers.

22. The method of claim 21, wherein the information associated with the individual loadings comprises one or more loading metrics, determined by each load balancer of the plurality of load balancers, associated with the individual loading of an instance of the plurality of identical instances by the load balancer.

23. The method of claim 21, wherein the information associated with the individual loadings comprises information indicative of a determination, by each load balancer of the plurality of load balancers, of the individual loading of an instance of the plurality of identical instances by the load balancer.

24. A method for handling packet flows between a pair of network security zones in a communications network, the method comprising:
receiving packets that are part of a bidirectional packet flow between the network security zones:

determining, based on relative loading of a plurality of identical instances of a security application running on a host machine, one instance of the plurality of identical instances of the security application to which to assign the bidirectional packet flow for security processing;

directing all of the received packets that are part of the bidirectional packet flow for processing on the host machine by the one of the security application instances, wherein the determining and the directing are implemented in each of a plurality of load balancers, each load balancer of the plurality of load balancers being associated with a respective one of a plurality of security applications including the security application, the method further comprising:

receiving packets associated with a plurality of bidirectional packet flows;

determining for each bidirectional packet flow of the plurality of bidirectional packet flows a respective one of the security applications of the plurality of security applications by which the bidirectional packet flow is to be processed;

sending all of the received packets that are associated with each bidirectional packet flow to the load balancer associated with the respective one of the plurality of security applications by which the bidirectional packet flow is to be processed, wherein one of the security zones comprises multiple tenants, wherein each load balancer of the plurality of load balancers is associated with a respective tenant, wherein the determining comprises determining the one of the security applications of the plurality of security applications by which each bidirectional packet flow is to be processed based on the one of the tenants to which each bidirectional packet flow belongs.

\* \* \* \* \*